US006049838A

United States Patent [19]

Miller et al.

[11] Patent Number: 6,049,838

[45] Date of Patent: Apr. 11, 2000

[54] PERSISTENT DISTRIBUTED CAPABILITIES

[75] Inventors: Mark S. Miller, Los Altos; Norman Hardy, Portola Valley; E. Dean Tribble, Los Altos Hills; Christopher T. Hibbert, Mountain View; Eric C. Hill, Palo Alto, all of Calif.

[73] Assignee: Sun Microsystems, Inc., Mountain View, Calif.

[21] Appl. No.: 08/673,058

[22] Filed: Jul. 1, 1996

[51] Int. Cl.[7] ............................ G06F 15/163; G06F 9/00; G06F 9/46

[52] U.S. Cl. ............................................... 709/303; 380/49

[58] Field of Search .................................... 395/680, 682, 395/683; 709/300, 302, 303, 229; 380/23, 24, 25, 49

[56] References Cited

U.S. PATENT DOCUMENTS

| | | | |
|---|---|---|---|
| 5,027,269 | 6/1991 | Grant et al. | 395/680 |
| 5,446,901 | 8/1995 | Owicki et al. | 711/154 |
| 5,603,031 | 2/1997 | White et al. | 395/683 |

OTHER PUBLICATIONS

Codie Wells: A Note on "Protection Imperfect" (1988) 2 pages.

Marc Shapiro, et. al.: Some Key Issues in the Design of Distributed Garbage Collection and References (Apr. 15, 1994) pp. 1–13.

M. Anderson, et al.: A Password–Capability System (1986) The Computer Journal, vol. 29, No. 1.

Andrew Birrell, et al.: Network Objects (SRC Research Reports #115) (Feb. 28, 1994) pp. 1–65.

Andrew Birrell, et al.: Distributed Garbage Collection for Network Objects (SRC Research Report #116) pp. 1–18.

Norm Hardy, The Confused Deputy (1985) 2 pages.

A.S. Tanenbaum, et al.: Using Sparse Capability in a Distributed Operating System (1986) Proc. Sixth Int'l Conf. On Distributed Computing Systems, IEEE, pp. 558–563.

Robert D. Sansom, et al.: Extending a Capability Based System into a Network Environment (1986) Research sponsored by DOD, pp. 265–274.

List of Ameoba Papers, 3 pages.

Robert van Renesse, et al.: Wide–Area Communication Under Amoeba (Dec. 1986) IR–117, Vrije Universiteit, pp. 114–126.

(List continued on next page.)

*Primary Examiner*—Alvin E. Oberley
*Assistant Examiner*—Peter Stecher
*Attorney, Agent, or Firm*—Pennie & Edmonds LLP

[57] ABSTRACT

A system and method is disclosed that provides persistent capabilities for distributed, object-oriented applications running on generally available hardware. The disclosed system and method operate in a transparent distributed object system where inter-process messaging between the program objects is effected by paired transport managers, proxies and matched in-table and out-table slots. Each object needing to communicate with an object in another address space does so by transparently issuing messages to that object's local proxy. Each process provides a registrar that includes a secret code table wherein an object is registered with a unique, practically unguessable secret code. Anticipating the need to re-establish object-proxy links following a inter-process communications fault, proxies are made revivable, meaning that their links with corresponding remote objects can be revived following a communications interruption. This is accomplished by a makeRevivable method that stores a revivable proxy's expiration date (the date beyond which the proxy is not revivable) and its corresponding remote object's secret code into the proxy's out-table slot. Upon the occurrence of a communications fault, all transport managers and tables are nulled out and then, when the communications fault is corrected, rebuilt by the transport managers. Sometime after the restoration of communications, a revived method is invoked that restores the links between, registered objects and proxies. The objects and proxies are brought back in a consistent state based on limited checkpointed data stored by the distributed program for the registered objects.

18 Claims, 12 Drawing Sheets

Process B
154b
B2
A2'
B2.foo(A2)
IT1'
[1]
OT1'
[3]
TM1'
160-TM1
data: 230-TM1
AK.AB 302-TM1
FP.B 304-TM1
methods: 200-TM
DH() 250
DES() 252
{(1).(foo(A2Proxy(3)))}AK.AB
[1] TM1
OT1
[3]
IT1
B2'
B2.foo(A2)
A1
A2
158-P
data: 200-P
pvtkey 320
pubkey 322
160-PA
class 220-PA
= 158-P
data: 230-PA
pvtkey.PA 320-PA
pubkey.PA 322-PA
Process A
154a

OTHER PUBLICATIONS

Robert van Renesse, et al.: Connecting RPC–Based Distributed Systems Using Wide–Area Networks (1987) Proc. Seventh Int'l Conf. on Distr. Comp. Systems, IEEE, pp. 28–34.

Robert van Renesse, et al.: The Performance of the Amoeba Distributed Operating System (Mar. 1989) Software—Practice and Experience, vol. 19, pp. 223–234.

M. Frans Kaashoek, et al.: Transparent Fault–Tolerance in Parallel Orca Programs (Mar. 1992) Symposium on Experiences with Distributed and Multiprocessor Systems III, Newport Beach, pp. 297–312.

Robert van Renesse, et al.: Voting with Ghosts (1988) Proc. Eighth Int'l. Conf. on Distr. Computer Systems, IEEE, pp. 456–461.

Henri E. Bal: A Comparative Study of Five Parallel Programming Languages (1991) EurOpen Spring 1991 Conference on Open Distributed Systems, Tromso, pp. 209–228.

Henri E. Bal: Replication Techniques for Speeding Up Parallel Applications on Distributed Systems (Oct. 1989) IR–202, Vrije Universiteit, pp. 1–19.

Tanenbaum, et al.: An Introduction to Amoeba, Vrije Universiteit, pp. 2–7.

S.J. Mullender, et al.: Amoeba—A Distributed Operating System for the 1990s (May 1990) Computer, Published by IEEE Computer Society, pp. 44–53.

F. Douglis, et al.: A Comparison of Two Distributed Systems: Amoeba and Sprite (Dec. 1991) Computing Systems, vol. 4, No. 3, pp. 353–384.

Henri E. Bal, et al.: Distributed Programming with Shared Data (1988) IEEE Conf. on Computer Languages, IEEE, pp. 82–91.

Henri E. Bal, et al.: Orca: A Language for Distributed Programming (Dec. 1987) IR–140, Vrije Universiteit, pp. 192–199.

G. van Rossum: AIL—A Class–Oriented RPC Stub Generator for Amoeba (1989) Proc. of the Workshop on Experience with Distr. Systems, Springer Verlag, pp. 82–90.

S.J. Mullender: Distributed Operating Systems: State–of–the–Art and Future Directions (1988) Proc. of the EUTECO 88 Conf., Vienna, Austria, pp. 53–60.

R. van Renesse, et al.: The Design of a High–Performance File Server (1989) Proc. Ninth Int'l Conf. on Distr. Comp. Systems, IEEE, pp. 22–27.

E.H. Baalbergen: Design and Implementation of Parallel Make (Spring 1988) Computing Systems, vol. 1, pp. 135–158.

A.S. Tanenbaum: The Amoeba Distributed Operating System (1993) Vrije Universiteit, 12 pages.

M.F. Kaashoek, et al.: An Efficient Reliable Broadcast Protocol (Oct. 1989) Operating Systems Review, vol. 23, pp. 5–19.

M.F. Kaashoek, et al.: Efficient Reliable Group Communication for Distributed Systems (Jun. 1992) IR–295, Vrije Universiteit, Amsterdam, pp. 1–51.

Overview of Amoeba, pp. 2–13.

C.R. Landau: Security in a Secure Capability–Based System (Oct. 1989) Operating Systems Review, 3 pages.

Sun Microsystems Laboratories, Inc.; SunConnect, Inc., Agorics, Inc.: Real–Time Video Delivery with Market–Based Resource Allocation, pp. 1–25.

Agorics Technical Report ADd004.4P: Joule: Distributed Application Foundations (Nov. 1994) pp. 1–93.

Netscape Communications Corporation: SSL v3.0: N Standards Documentation (1995), pp.

B.W. Lampson: A Note on the Confinement Problem (1973) ACM, vol. 16, No. 10, 5 pages.

A.S. Tanenbaum: Distributed Operating Systems (1995) Vrije Universiteit, Amsterdam, The Netherlands, (1995) Prentice Hall.

D. Hellman: Weak Table References, five vague descriptions.

Miller, et al.: Markets and Computation: Agoric Open Systems (1988) The Ecology of Computation, pp. 1–44.

USA–Japan Computer Conference Proceedings: Table of Contents (Oct. 1978).

Strom, et al.: Optimistic Recovery: An Asynchronous Approach to Fault–Tolerance in Distributed Systems (Proc. FTCS–14, Jun. 1984) IEEE, pp. 374–379.

Kahn, et al.: Money as a Concurrent Logic Program (1988) pp. 1–23.

S.E. Abdullahi, et al.: Collection Schemes for Distributed Garbage, (Sep. 1992) Int'l. Workshop on Memory Management (IWMM) 92, Springer Verlag, pp. 43–81.

P.B. Bishop: Computers with a Large Address Space and Garbage Collection (May 1977) MIT Lab. For Computer Science (LCS) Technical Rpt. 178, MIT, Cambridge, MA.

W.D. Clinger: Foundations of Actor Semantics (May 1981) MIT, Cambridge, MA.

J.E. Donnelley: Managing Domains in a Network Operating System (1981) Proceedings of the Conference on Local Networks and Distributed Office Systems, Online, pp. 345–361.

C.N.R. Dellar: Removing Backing Store Administration from the Cap Operating System (1980) Operating Systems Review, vol. 14, No. 4, pp. 41–49.

A. Elhabash, et al.: Garbage collection in an Object Oriented, Distributed, Persistent Environment (1990) ECOOP/OOPSLA '90 Workshop on Garbage Collection.

Hardy U.S. Patent No. 4,584,639 dated Apr. 22, 1986: Computer Security System.

P. Ferreira, et al.: Larchant: Persistence by Reachability in Distributed Shared Memory Through Garbage Collection (May 1996) 16th Intl. Confer. On Distributed Computer Systems (ICDCS) Hong Kong, pp. 1–8.

N. Hardy: KeyKOS Architecture (Sep. 1985) Operating System Review, pp. 1–23.

K. Kahn, et al.: Language Design and Open Systems, The Ecology of Computation (1981), pp. 1–25.

E. Kolodner: Atomic Incremental Garbage Collection and Recovery for Large Stable Heaps Implementing Persistent Object Bases: Principles and Practice, 4th Intl. Workshop on Persistent Object Systems, Morgan Kaufman, San Mateo, CA (1991).

H. Levy: Capability– and Object–Based System Concepts, Digital Press (1984) pp. 1–18.

M.S. Miller, et al.: Logical Secrets, Concurrent Prolog: Collected Papers, vol. 2, MIT Press (1987) pp. 140–161.

J.E.B. Moss: Garbage Collecting Persistent Object Stores, ECOOP/OOPSLA '90 Workshop on Garbage Collection (Oct. 1990) pp. 1–5.

S.J. Mullender: Accounting and Resource Control, Distributed Systems, edited by S.J. Mullender, ACM (1989) pp. 133–145.

D. Plainfosse, et al.: A Survey of Distributed Garbage Collection Techniques, Proceedings of the Intl. Workshop on Memory Management, Kinross, Scotland (Sep. 1995) pp. 211–249.

B. Schneier: Applied Cryptography, Protocols, Algorithms, and Source Code in C.
P.R. Wilson: Uniprocessor Garbage Collection Techniques, Intl. Workshop on Memory Mgmt. (IWMM) 92, Springer Verlag (Sep. 1992) pp. 1–42.
R.P. Draves, et al.: Using Continuations to Implement Thread Management and Communication in Operating Systems, School of Computer Science, Carnegie Mellon University, Pittsburgh, PA, 15 pages.
R.W. Dean: Using Continuations to Build a User–Level Threads Library, School of Computer Science, Carnegie Mellon University, Pittsburgh, PA, 17 pages.
J.S. Barrera, III: A Fast Mach Metwork IPC Implementation, School of Computer Science, Carnegie Mellon University, Pittsburgh, PA, 11 pages.
R. Draves: A Revised IPC Interface, (1991) pp. 1–14.
W.S. Frantz, et al.: Object Oriented Transaction Processing in the KeyKOS Microkernel (Sep. 1993) pp. 1–16.
R. Rashid, et al.: Mach: A Foundation for Open Systems, School of Computer Science, Carnegie Mellon University, Pittsburgh, PA, 6 pages.
D.V. Duong: Project Report: Trader Network LRNG 792: Computational Modeling of Social Learning (1995) pp. 1–6.
J.E.B. Moss, et al.: PMOS: A Complete and Coarse–Grained Incremental Garbage Collector for Persistent Object Stores, ECOOP/OOPSLA '90 Workshop on Garbage Collection (1990) pp. 1–13.
P. Bogle, et al.: Reducing Cross Domain Call Overhead Using Batched Futures, OOPSLA 9th Annual Conference (Oct. 23–27, 1994) pp. 341–354.
D. Tribble, et al.: Channels: A Generalization of Streams, Collected Papers, pp. 447–463.
J.S. Auerbach, et al.: High–Level Language Support for Programming Distributed Systems, 1992 Intl. Conference on Computer Languages (Apr. 20–23, 1992), pp. 320–330.
ParcPlace VisualWorks: Chapter 18: Weak Arrays and Finalization, pp. 311–318.
M. Schelvis: Incremental Distribution of Timestamp Packets: A New Approach to Distributed Garbage Collection, Object–Oriented Programming: Systems, Languages and Application, OOPSLA Conference Proceedings, vol. 24, No. 10 (Oct. 1–6, 1989) pp. 37–48.
S.E. Abdullahi, et al.: Collection Schemes for Distributed Garbage, Intl. Workshop on Memory Management (IWMM) 92, Springer Verlag, pp. 43–81 (Sep. 1992).
R.F. Rashid: From RIG to Accent to Mach: The Evolution of a Network Operating System, Studies in Computer Science and Artificial Intelligence (1988) The Ecology of Computation, North Holland, pp. 207–229.
D.F. Ferguson: The Application of Microeconomics to the Design of Resource Allocation and Control Algorithms, pp. 1–156.
Object Management Group: The Common Object Request Broker: Architecture and Specification (Jul. 1995) sections 1–21.
William A. Wulf, et al.: HYDRA/C.mmp—An Experimental Computer System (1981) pp. 1–282, McGraw Hill, NY.
Stephen Walker, Steven Lipner, Carl Ellison, David Balenson, Commercial Key Recovery, Communications of the ACM, vol. 39, No. 3, p. 41–47, Mar. 1996.
Ravi Ganesan, How to Use Key Escrow, Communications of the ACM, vol. 39, No. 3 p. 33–40, Mar. 1996.
David Maher, Crypto Backup and Key Escrow, Communications of the ACM, vol. 39, No. 3, p. 48–53, Mar. 1996.
Dorothy Penning, Penny Bransted, A Taxonomy for Key Escrow Encryption Systems Communications of the ACM, vol. 39, No. 3, p. 34–40, Mar. 1996.
SOM Objects Developer Toolkit Users Guide, Version 2.0, IBM, p. 6–1–6–22, Jun. 1993.

PERSISTENT DISTRIBUTED CAPABILITIES

The present invention relates generally to distributed computing and, particularly, to systems and methods for enabling the processes composing a distributed computing system to recover their distributed states following various types of communication interruptions.

BACKGROUND OF THE INVENTION

It is well known how to construct distributed, object-oriented applications, components of which (i.e., the application's constituent objects), execute on different machines and communicate (i.e., exchange messages) across the machine boundaries. One such system is shown in FIG. 1, consisting of two machines M1, M2 and four processes A, B, C, D. Each process runs in a different address space in its respective host machine and includes one or more objects which perform the tasks associated with the process. For example, the process A includes three objects A1, A2, A3.

In a distributed object system, inter-object communications can be represented in the form: destination.message_ name( ). For example, a programmer can specify that the object C1 issue a message to the object A1 using the syntax: "A/A1.foo( )", where "foo( )" denotes the message ("foo" being the message name and "( )" the arguments) and "A/A1" is the message destination (object A1 in process A). Note that in a typical distributed object system the programmer would not actually need to write the destination as "A/A1"; however, for the purposes of the present application this syntax is used to highlight the process and object to which a message is being sent.

Most distributed object systems have evolved to allow transparent message passing. Allowing distributed objects to communicate in a transparent fashion means that a distributed object system must support intra-process, inter-process and inter-machine communications between objects in a way that is transparent to the user, programmer or objects. i.e., transparency means that an object need not be strictly aware of other objects' locations when issuing messages. For example, if the distributed object system of FIG. 1 supported transparent messaging, the objects C1 and A2 could issue the message "foo( )" to the object A1 using the same syntax: A1.foo( ).

However, even in transparent distributed object systems, there are significant implementation differences between intra-process, inter-process and inter-machine communications that must be addressed. Intra-process communications are faster and more reliable then the other types of communications, consisting of the simple passing of local pointers. Inter-process messaging is also fast, since it occurs within a machine, but additionally requires that object addresses be translated between different processes. Inter-machine communications are much slower and less reliable than the other two types of messaging due to latency associated with issuing messages across an external communications channel and the relatively greater likelihood of channel failure. All of these issues are dealt with in one way or another by the prior art.

Object security is a significant issue raised by distributed object systems. Security problems arise due to the potential lack of trustworthiness of objects, processes and machines. For example, referring to FIG. 1, assume that the objects A1 and A2 are, respectively, a very powerful object and a misbehaving object. If A2 were somehow given access to the full power (i.e., methods) of A1, then A2 could disrupt process A using the full power of A1's methods. Similar security problems can arise between processes (e.g., when access to a process is given to an object in an untrustworthy process) or between machines (e.g., where a misbehaving machine issues unauthorized messages to an object running on another machine). Many distributed object systems have not attempted to deal with these security issues; other systems have provided incomplete solutions that deal with only a subset of the above-mentioned object, process and machine trust issues. However, the prior art includes one technique, called capability security, that addresses most of these problems, albeit only locally (i.e., within a process). Thus, there is a need to extend the ideas of capability security to distributed systems.

The basic tenet of capability security is that the right to do something to an object (i.e., invoke a particular object's methods) is represented solely by the holding of a reference to the particular object. To prevent the unauthorized exercise of rights by misbehaving objects, capability security only allows an object to acquire the capability (i.e., object reference) to access a particular object in one of the following ways:

(1) by receiving the capability from an object that already holds that right (through a message or during creation); and (2) by being the object that created the particular object.

Thus, referring again to FIG. 1, in an object system that implements capability security, the object A1 could not pass to the object A3 a reference to the object D1 as A1 does not have that capability (in FIG. 1, a directed arrow represents the right to access the object at the end of the arrow).

Traditionally, capability security has been implemented using front end objects, as shown in FIG. 2. In this figure, the object A1 is a very powerful object whose respective methods (not shown) are accessed through the messages msg1, msg2, and msg3. The objects A2, A3 and A4 are less powerful front-end objects that only respond to a subset of the messages supported by A1. For example, the object A2 only responds to msg1. This means that, even though the object A2 can access the object A1, it only exercises the limited set of A1's powers corresponding to msg1. Therefore, by exporting references to different subsets of the front end objects, different capability subsets with respect to the object A1 can be created. For example, referring to FIG. 2, the Requestor only has the capability (an object has a capability if it (1) has a right and (2) knows the ID/location of the object for which it possesses the right) to access the object A2, which means that it can only invoke the methods of the object A1 that are triggered by msg1. The Requestor could, by receiving a reference to the object A3, also acquire the additional capability to cause msg2 to be issued to the object A1. Of course, the presence of a capability security system ensures that rights can only be passed by authorized objects.

The traditional formulation of capability security does not make explicit all of the security problems that can arise in distributed object systems. Because capability security was not designed with distributed systems in mind its inventors did not include in their formulation techniques for solving the problems of distributed systems that are due to possibly misbehaving processes and remote objects and insecure communications channels. The traditional definition of capability security does not explicitly forbid an imposter from interfering with the normal process of message reception and/or decoding so as to stand in for one of the capabilities transmitted. For example, referring again to FIG. 1, if the object C1 passed a reference for the object B1 to the object A1, but the object D1 interfered with the reception and/or decoding of the message by A1, A1 might then come to hold a capability to D1, thinking that it got this capability from C1. A1 might then send messages to D1 that it intended to send only to the object referred to it by C1. Therefore, there is a need for an extended definition of capability security for distributed object systems to indicate that the capabilities that a recipient receives correspond exactly to those that the sender sent.

Another possible problem arising in a distributed object system that can exist under the traditional definition of capability security is what we shall call "confusing the deputy". Referring again to FIG. 1, this is the situation where a first object (e.g., C1) that does not hold a reference to a second object (e.g, A3) tries to pass a message to a third object to which it does have access (e.g, A1), where the third object itself has access to the second object (A3), that would fool the third object A1 into believing that the first object (C1) does have access to the third object. By doing this, there is a possibility that the first object (C1) could induce the third object A1 to issue messages to the second object which the first object C1 itself could not issue. Therefore, there is a need for an extended definition of capability security adaptable to distributed object systems that prevents the problem of confusing the deputy (in the preceding example, A1 is the deputy).

The above two problems point out loopholes in the traditional definition of capability security. Most implemented non-distributed capability security systems do not actually have these loopholes. However, these loopholes are more likely to be present in implementations of distributed capability security systems, which is why there is a need for a revised formulation of capability security when engineering distributed capability systems.

As the objects composing a distributed, object-oriented application, or system, can be distributed over multiple networked computers, system operations can be interrupted by communications or machine failures. For example, in the distributed object system of FIG. 1, just after the object C1 has sent an object reference message to the object A1, machine M2 or machine M1 could go down, or a network partition (failure) could occur. In the case of a machine failure, the state of the objects running on the failed machine and the state of the executing program that includes those objects, could be lost. The potential loss of object and program state due to machine failure is disruptive to distributed applications and is referred to as a lack of persistence (note: persistent systems retain certain state information so that processing can resume after a system crash).

Some highly specialized prior art systems, such as distributed, fault tolerant computer systems, provide object persistence through fast, non-volatile memory, hardware redundancy and checkpointing. Briefly, in such systems, computations are performed redundantly on two machines. At critical points during the program's execution, the state of relevant program components (such as the stacks and all active objects) is checkpointed, or written to the non-volatile memory in each machine. Upon the failure of one of the redundant machines, the other machine continues executing the application, all the time checkpointing its state so that it can update the failed machine (i.e., its stack and object states) from the latest checkpoint whenever the failed machine is revived.

However, given the explosion of network and distributed computing, there are many distributed, object-oriented applications that are executed on generally available hardware (e.g., workstations and personal computers) not specifically designed to provide redundancy and object persistence. These systems lack the fault tolerant systems' fast, non-volatile memory and built-in redundancy. In fact, in many generally available machines, the only non-volatile memory is a slow, hard disk drive. As a result, it is not possible using generally available hardware to checkpoint the data at the rates needed to achieve transparent revival of failed machines in the absence of on-line redundant machines. Therefore, there is a need for a system that provides persistence for distributed object-oriented applications in the context of networks of general, non-redundant computers.

The other possible disruption to distributed applications is a network partition. When a network partition occurs, issued messages may or may not be received, meaning that, when network communications are re-established between two processes that were formerly in communication, those processes are likely to have inconsistent states. For example, a process that sent a message just prior to the partition might not receive (due to the partition) an acknowledgment transmitted by the message's recipient indicating that the message was received.

The specialized fault tolerant systems discussed above get around the problem of network partitions through built-in re-synchronization procedures, wherein the checkpointed data is used to establish a consistent state on the redundant machines executing the application that was interrupted.

There are also software-only systems designed to deal with these distributed failure issues in a totally transparent manner, but these are generally expensive, complex to implement, are not designed to function among potentially misbehaving participants (e.g., they operate by synchronizing checkpoint times), and make unrealistic assumptions about the impossibility of certain failures. In particular, all systems designed to provide fully transparent recovery, whether hardware or software, necessarily assume that it never happens that all copies of a committed piece of data are lost.

Because generally available hardware does not provide full redundancy or fast non-volatile memory, the approach of the specialized, fault-tolerant systems is not applicable to distributed, object-oriented applications running on networks of generally available computers. Therefore, there is a need for a system that provides persistent distributed objects in such a way that distributed processes can re-establish a consistent system state after a network partition. Also, there is a need for such a system to be able to accommodate changes in the locations of the formerly communicating processes after the partition is repaired.

Finally, given the importance of security in distributed applications, it is vital that any solution to the aforementioned problems not compromise the inter-process and inter-machine security provided by the underlying distributed system. For example, if the underlying objects and processes implement capability security, the system that provides persistence must uphold capability security.

SUMMARY OF THE INVENTION

The present invention is a system and method that meets the needs set out above. More particularly, the present invention is a system providing persistent distributed capabilities for distributed object systems.

The present invention comprises an object-oriented application program including a plurality of distributed objects, the distributed objects being executed within a plurality of processes hosted by a plurality of computers. To substantially raise the probability that their state will survive hardware or process failures, many of these processes periodically (or when requested) snapshot their states to non-volatile memory. Such snapshots are called checkpoints. Should such a failure occur, the process's hosting system is configured to restore the process from its last complete checkpoint. Unfortunately, given the constraints of generally available hardware and the desired performance, the process as restored from its checkpoint will often constitute a regression of the process to an earlier state. The effects on the memory of the process resulting from its conversations, between its snapshot time and its failure, will have been forgotten. We say that this process has experienced "amnesia", because, from the point of view of the processes with which it is conversing, those processes are now conversing with an amnesiac. Were the conversation to proceed without awareness of this fact, confusion and possibly damage could result.

The present invention allows applications programs to engage in application-specific recovery actions to recover from amnesia, lost messages due to communications failure, and the perpetual absence (i.e., death) of some participating process. Perpetual unavailability of a process can arise, from loss of its checkpoint data, from the choice by the process's proprietor to never again run the process, or for various other reasons. The issue of permanent unavailability is the clearest case for the need to make the occurrence of a failure apparent, rather than transparent, to applications programs, so that they may recover and continue.

Enabling transparent communications between the distributed objects are a pair of transports allocated to each pair of the processes for which inter-process communications are available. Each of these transports include: an in-table with indexed in-table slots and an out-table with indexed out-table slots, where respective ones of the out-table slots of a first transport of the pair of transports and the in-table slots of a second transport of the pair of transports are linked. Cooperating with the transports are a plurality of proxies, each linked to a respective program object that is resident in a different process via one of the linked slots. These proxies and pairs of transports enable a first object in a first process to communicate transparently with a second object in a second process via a second proxy in the first process linked to the second object.

The present invention also includes a registrar that maintains a registry of objects in its local process. Each entry of the registry includes for one object a secret number and an expiration date. Following a communication fault between first and second process, either at the earliest time it is possible for inter-process communications to be rebuilt or on demand, the processes are configured to rebuild the first and second transports, assigning new slot indices to objects and proxies which were formerly communicating across the interface and which are revivable. The processes re-establish slot linkages between corresponding objects and proxies by matching secret numbers of the corresponding revivable object and proxies.

Alternatively, the processes could automatically rebuild the communications links between the first and second processes as soon as possible following a communications fault without a demand for revival so that, when a revival request occurs, it can be handled with dispatch.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 3:
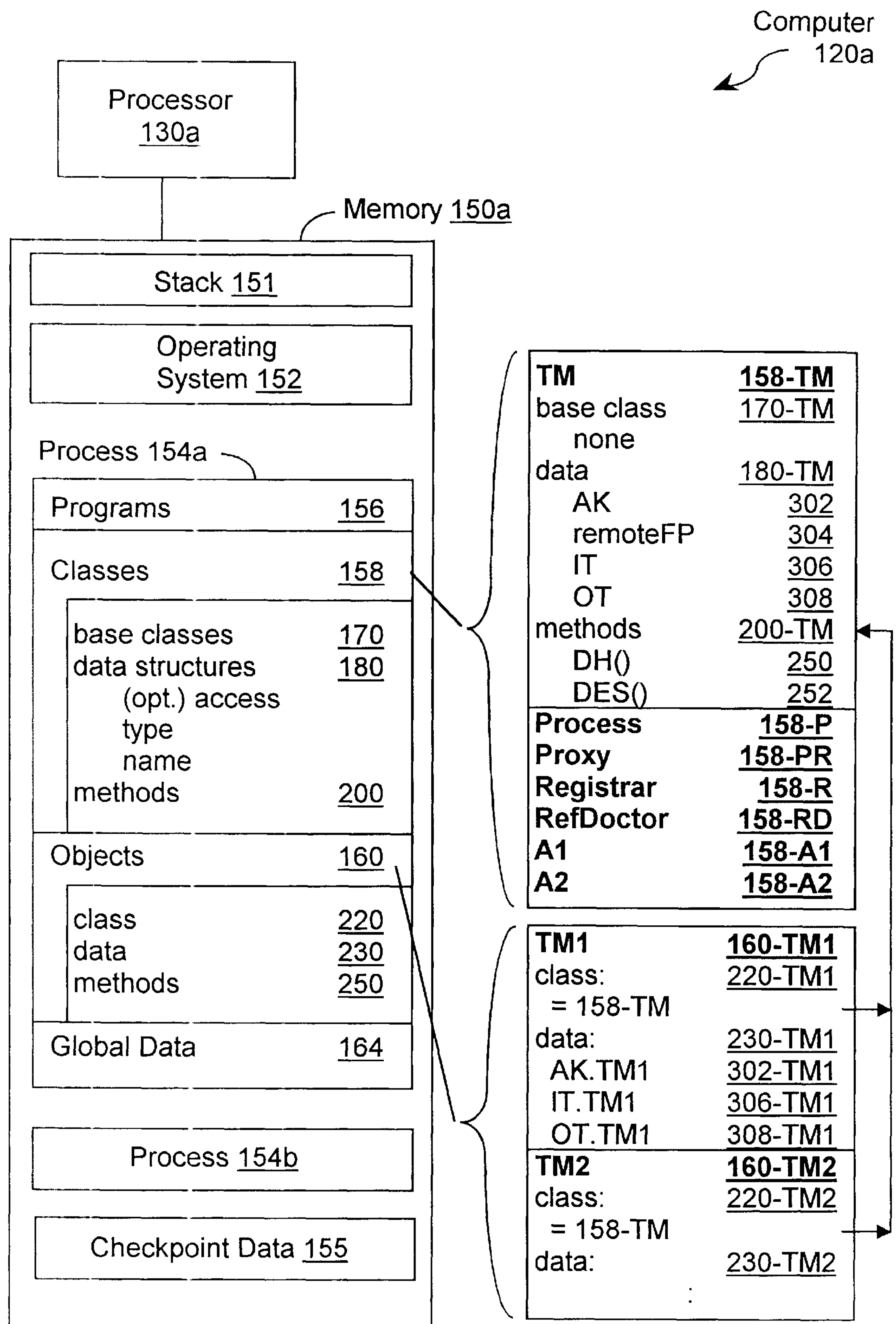
FIG. 3 is a block diagram of a computer system in which the present invention is implemented.

Referring to FIG. 3, there is shown a block diagram of a networked computer 120*a* (corresponding to any of the machines from FIG. 1) in which the preferred embodiment of the present invention is implemented. The computer 120*a* includes a processor 130*a* and a memory 150*a*. The memory 150*a* could be a fast primary memory, such as a random access memory; a cache memory; a slower secondary memory, such as a hard disk; or any combination of those three types of memory. Details of these software and hardware components are now presented for the representative computer 120*a*.

The memory 150*a* of the computer 120*a* includes stacks 151 within each process, an operating system 152, checkpoint data 155 and one or more processes 154*a*, 154*b*, each of which occupies a separate address space in the memory 150*a* at runtime. Each process 154 includes programs 156, class and object specifications 158, 160 and a global data area 164. The operating system 152 executes in the processor as long as the computer 120 is operational and provides system services for the processor 150 and programs 156 being executed in the processor 150. The programs 156 can be any kind of program, including the object-oriented programs to which the present application is directed.

As is well known, a program 156 written in an object-oriented language, such as C++, includes class definitions

158 and object declarations 160. Each class definition 158 outlines the data structures 180 and methods 200 associated with that class. A data structure declaration 180 defines the type of the data item (e.g., whether the data item is a structure, an integer, or a user-defined type) and optionally, the accessibility of the data item (i.e., whether the data item is public, meaning accessible to all objects, or private, meaning visible only within object instances of the declared class). A class definition 158 can also optionally identify one or more base classes 170 from which that class inherits methods and data structures.

For example, referring to FIG. 3, a Transport Manager class 158-TM can be defined as including the following elements:

(1) base class 170-TM:
  none
(2) data structures 180-TM:
  agreed_key (AK) 302:
    a private variable that is used by an instance of the class TM to hold an encryption key for a single key cryptographic system (such as DES) that is shared with one other process;
  remote fingerprint (remoteFP) 304:
    a private variable that holds the fingerprint of the public key (described below) of a remote process;
  in-table (IT) 306:
    a table whose slots are associated with local objects to which it can direct incoming messages;
  out-table (OT) 308:
    a table whose slots are associated with local proxies for remote objects;
(3) methods 200-TM:
  Diffie-Helman (DH) 250:
    a method used by an instance of the class TM to negotiate the agreed key AK according to Diffie-Helman (DH) principles;
  Data Encryption Standard (DES) 252:
    a single key encryption/decryption routine that makes use of the agreed key (AK).

The TM class 158-TM shall be described in greater detail below. Other classes 158 provided by the preferred embodiment include:

Process 158-P;

Proxy 158-PR;

Registrar 158-R;

Reference Doctor (ref-doctor) 158-RD; and

Figure 1:
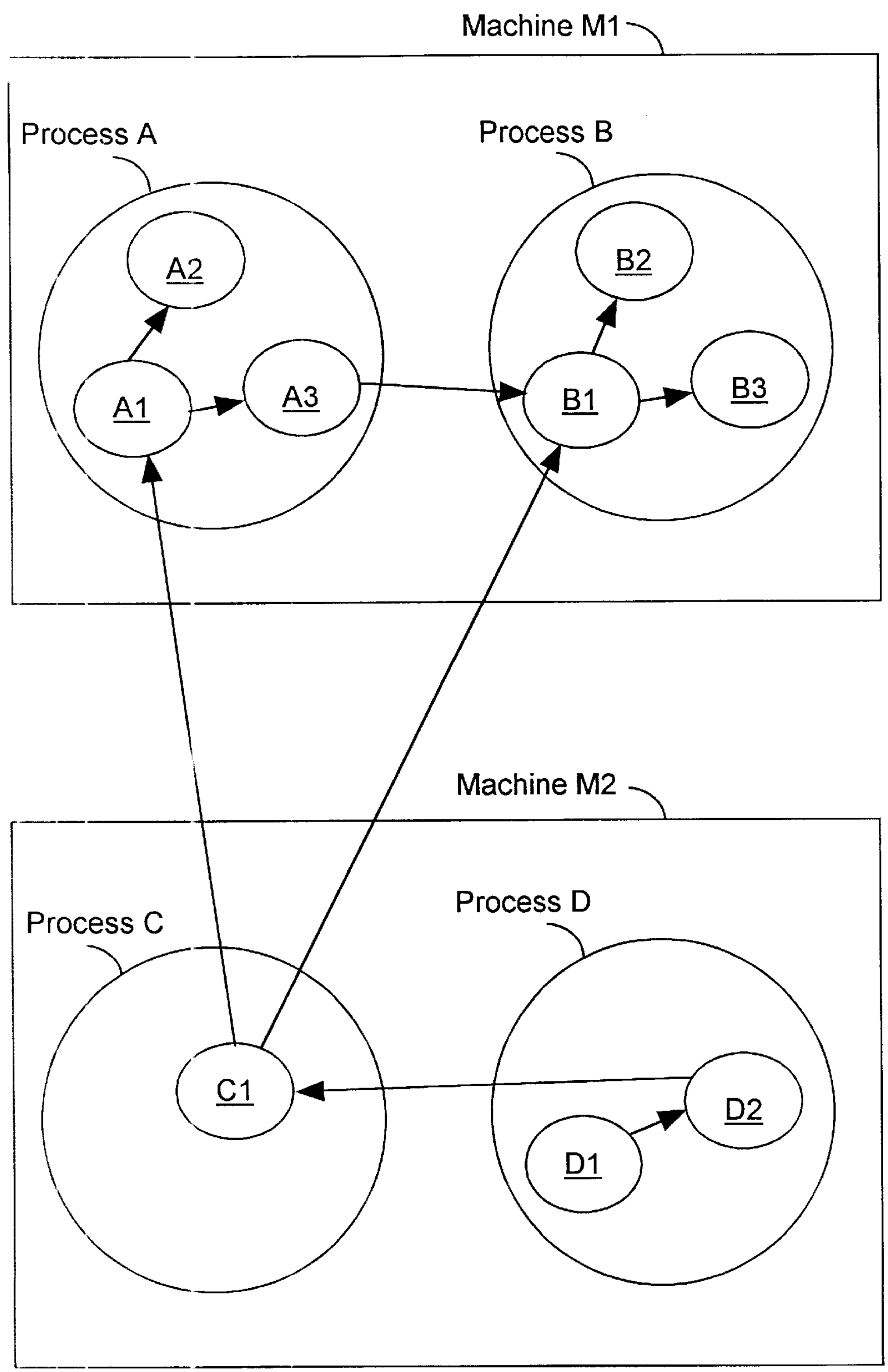
FIG. 1 is a depiction of a distributed object system consisting of two machines, four processes and multiple objects.

Object classes 158-x for the objects that compose the distributed applications (e.g., classes 158-A1 and 158-A2 for the objects A1 and A2 of FIG. 1).

Objects are instances of one or more classes 158 and incorporate all of the properties (i.e., methods and data structures) of the classes of which they are instances. In contrast to the classes 158, which, in most object-oriented languages, are defined at compile-time, the objects 160 are run-time entities that, in response to messages received from the programs 156 or another object 160, execute their methods and update their own data as a part of program execution. Each object's storage 160 includes a "class" field 220 that indicates the associated classes of which the particular object 160 is an instance and the data 230 derived from those associated classes. The object's methods are not held in the object storage 160, but in the associated class 158. Thus, referring to FIG. 3, the "TM1" Object 160-TM1 is declared to be an object instance of the TM class 158-TM via the "class" field 220-TM1. As a result, the data 230-TM1 and methods of the TM1 object 160-TM include an agreed key 302-TM1 (AK.TM1), an in-table 306-TM1 (IT1) and an out-table 308-TM1 (OT1). Multiple instances of a single class can exist. For example, FIG. 3 also depicts storage for a TM2 object 160-TM2, which is another instance of the TM class 158-TM.

Before further describing the classes, objects, organization and methods of operation of the present invention, an explanation will be provided of the environment in which the preferred embodiment operates.

The preferred embodiment of the present invention provides persistent distributed capabilities for transparent, distributed object systems that enforce capability security for all inter-process and inter-machine communications. In other words, the present invention provides a system and method that enable distributed, object-oriented applications that are executing on multiple networked computers to resume operations in a consistent state following a network partition or the failure of a machine hosting one of the application's constituent processes. Before discussing what is meant by capability security in the context of a transparent, distributed object system, one such prior art transparent distributed object system is described in reference to FIG. 4.

Figure 4:
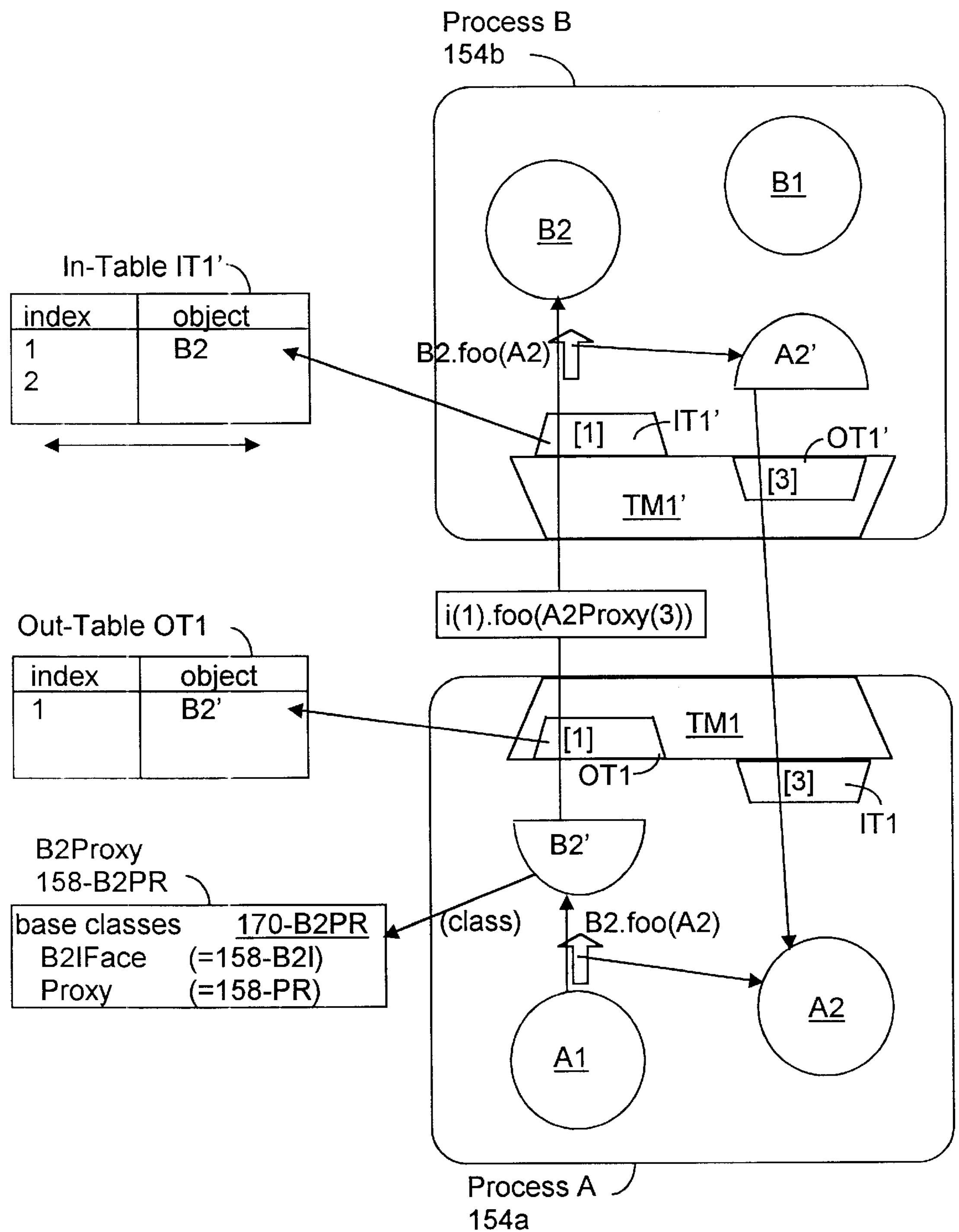
FIG. 4 is a depiction of a prior art transparent distributed object system.

Referring to FIG. 4, there is shown a prior art system that provides transparency in distributed object systems through the use of object proxies, which act as intermediaries between objects in different address spaces, and transport managers, which handle inter-address space communications and create and destroy proxies as needed. As do subsequent figures, FIG. 4 shows (1) the communications links (depicted as directed arrows) between plural objects 160 resident in a multitude of processes 154 and (2) the form of particular messages 161 issued by one object to another along a subset of those links. More particularly, the embodiment of FIG. 4 is illustrated for a process A 154*a* that includes two program objects, A1 160-*a*1, A2 160-*a*2 and one proxy B2' 160-*a*3, and a process B 154*b* that includes two program objects, B1 160-*b*1, B2 160-*b*2 and a proxy object A2' 160-*a*1. Each of these objects is an instance of a respective class. For example, the objects A1 and A2 are instances of the A1 class 158-*a*1 and A2 class 158-*a*2 (FIG. 4), respectively. The system of FIG. 4 also includes two transport manager objects TM1 and TM1', associated respectively with process A and process B. Each of these transport managers has an out-table OT and in-table IT.

In this system, objects pass messages using only language pointers/local addresses (i.e., an object only needs to know how to pass messages within its object space). Of course, in a distributed object system, not all objects with which an object needs to interface are conveniently located in the same address space. Therefore, when a first object needs to hold a reference to a remote object, a local proxy object is created in the first object's address space to act as a local stand-in for its remote sibling (i.e., the proxy object picks up messages issued to its remote sibling by local objects and ensures that those messages are delivered, via a transport manager, to its sibling). To enable these functions, each proxy object inherits from two interfaces: (1) the interface of the object for which it is a proxy (so it can respond to all of its sibling object's messages) and the "proxy" interface, which defines the methods associated with all proxies. For example, an object proxy B2' is an instance of B2IFace and Proxy.

For an object to forward a message via a proxy to its remote sibling requires a pair of transport managers (TM), one in each process. Each TM has an in-table (IT) and an out-table (OT). An in-table contains pointers to local objects, using indices corresponding to those used by the corresponding out-table in the corresponding TM for the corresponding proxy. Each proxy knows its index in the local out-table. When a message is sent to a proxy, the proxy forwards it to its sibling (identified by the index), repackaging any arguments as described below.

Alternatively, it is not necessary that a proxy and its remote sibling share the same index in corresponding in- and out-tables. Instead, it is only necessary that (a) the transport manager can derive the in-table index of the remote object from the out-table index provided by the proxy or (b) that the proxy actually knows the in-table index of its corresponding sibling, which it can provide to the transport manager along with its own, different, out-table index.

Arguments to be sent by value (e.g., strings, numbers, boolean values) are encoded directly. Arguments that are local objects which are already known to the remote process are encoded using their index in the remote process's out-tables. Local objects for which the remote process does not have an entry are first added at a new index in the local process's in-table and then encoded as a known local object. Objects that are locally known via a proxy to the destination process are encoded using their index in the destination TM's in-table. Objects which are local proxies to objects stored somewhere other than the destination process require a three-party handoff (described below).

When an incoming message is received by a TM, it finds the receiver in the in-table corresponding to the source of the message using the slot identified in the message (e.g., "i(1)" in FIG. 4). Arguments sent by value are created directly from their encoding. Arguments that are local to the destination system are decoded (as was the receiver itself) by look-up in the destination TM's in-table. Objects which are local to the source are decoded by look-up in the destination out-table (e.g., "A2Proxy(3)" in FIG. 4). If the indicated slot in the out-table is empty, a new proxy is created at the indicated index with the indicated type.

For example, as shown in FIG. 4, assume that the object A1 is trying to pass an object reference for the local object A2 to the remote object B2. Because B2 is remote from A1, a proxy object B2' exists in process A for the remote object B2. The transport managers TM1 and TM1' coordinate communications between the processes A and B. These transport managers TM1 and TM1' link B2's proxy and B2 by respectively assigning the objects B2' and B2 a slot index of 1 in the output and input tables OT1, IT1'.

A1 initiates the process of sending the object reference for A2 to B2 by issuing the language level message "B2.foo (A2)". This message is picked up by the local proxy object B2', which in turn tells the transport manager TM1 to issue an appropriate object reference message to its sibling TM1' at index 1 of its in-table IT1'. The transport manager TM1 responds by issuing the network message "i(1).foo(A2Proxy (3))" to TM1'. This message tells the remote transport manager TM1' to issue the language level message "foo (A2')" to the local object "B2" associated with the in-table index 1, thereby completing the process of passing the object reference for the object A2 to the object B2. Once B2 knows about A2, it can issue language-level messages to A2 (e.g, "A2.foo( )"), which are handled by the A2Proxy and the transports TM1, TM1' as described above. Of course if the proxy is not already present, the remote TM creates it.

This prior art system provides transparency for distributed object-oriented systems. However, it provides no security. This failing is addressed by the system shown in FIG. 5, which provides capability security for transparent, distributed, object-oriented systems such as the one of FIG. 4.

As set out above, the basic tenet of capability security is that the right to do something to an object (e.g., invoke a particular object's methods) is represented solely by the holding of a reference to the particular object. In the system described in reference to FIG. 5, an object is presumed to hold legitimately a reference to a particular object only if the object knows some unpublicized (except under the three conditions required by capability security) key associated with the particular object. In other words, anyone who knows the key has the right of access the object. Additionally, the objects are able to ensure that the process hosting the object that they are sending a message to can only be the one that the capability designates. This is accomplished in this system through the use of Diffie-Helman cryptography, or any other public key based key agreement protocol which assures the sender. Other forms of cryptography applied to inter-process messages, such as public-key cryptography, could also be employed by the transports.

Figure 5:
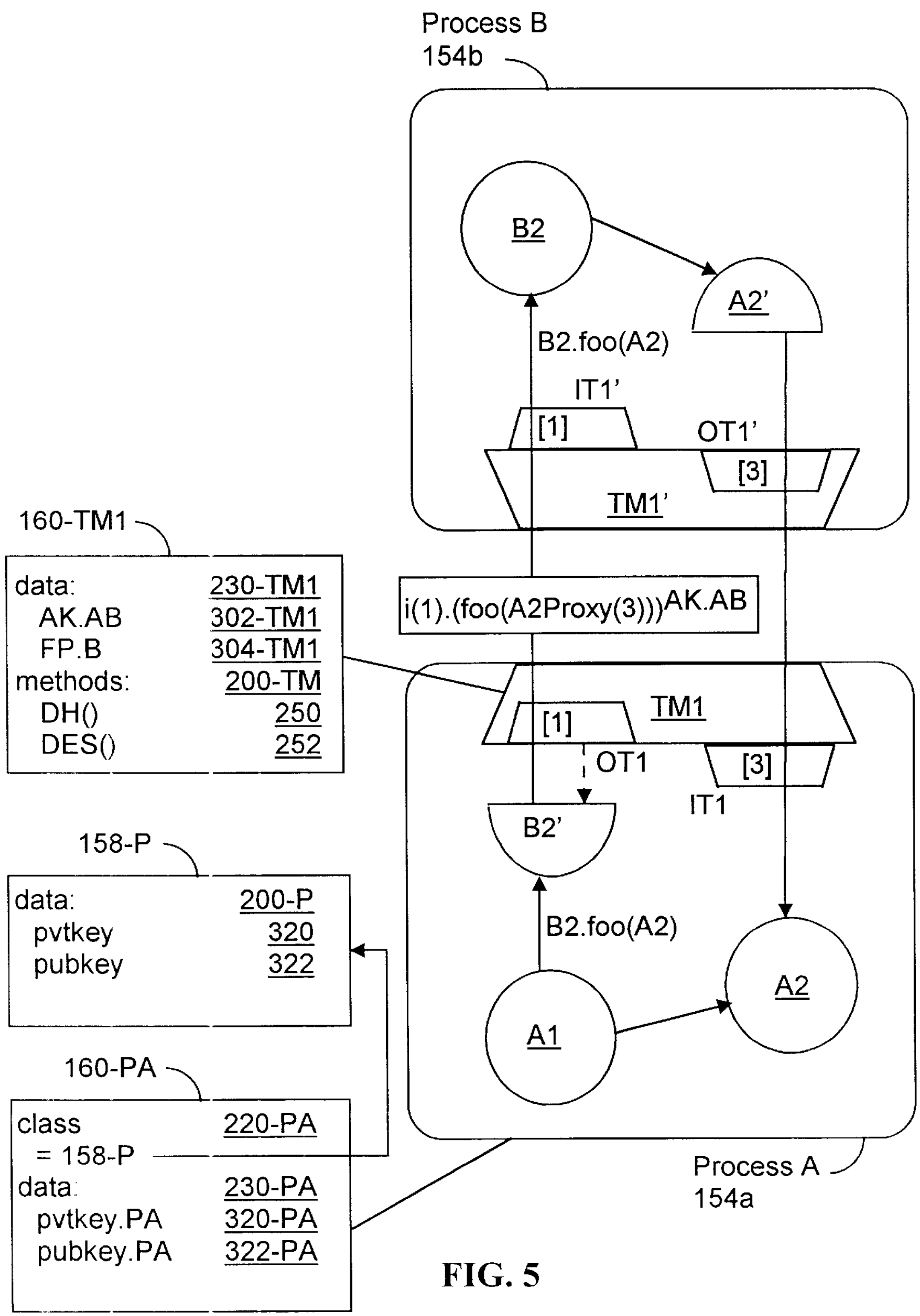
FIG. 5 is a depiction of a capability security system for transparent, distributed, object-oriented programs that makes use of Diffie-Helman key exchange encryption techniques to provide security between address spaces and transport objects to provide security between objects passing object references between different address spaces.

The embodiment of FIG. 5 includes objects that are instances of the basic classes set out in FIG. 4 (i.e., processes, transports, in-tables, out-tables, objects and object proxies). More particularly, the system shown in FIG. 5 includes the same two processes A and B, transport managers TM1 and TM1', program objects A1, A2 and B2 and proxy objects B2' and A2', all of which include the functionality described in reference to FIG. 4. Unlike the embodiment of FIG. 4, the transport managers TM1, TM1' of FIG. 5 also include additional security methods 200-TM (recall that these methods are associated with the TM class 158-TM). In this system, these methods include "DH( )" 250 and "DES( )" 252, which were described in reference to FIG. 3.

The process class 158-P includes a private key (pvtkey) 320 and public key (pubkey) 322. Consequently, the object storage 160-PA for process A, which is an instance of the process class 158-P, includes a private key 320-PA (pvtkey.A) and public key 322-PA (pubkey.A). In the preferred embodiment each process has a fingerprint FP (e.g., FP.A), which is the hash of the process's public key (e.g., pubkey.A). The hash function is selected so the fingerprint FP.i is a much smaller substitute for the corresponding public key pubkey.i (e.g., whereas a reasonable Diffie-Helman public key has on the order of 1000 bits, a reasonable fingerprint needs only to be between 64 and 128 bits in length). In fact, the only reason the fingerprint is used in the preferred embodiment is that is cheaper than storing and comparing keys. One requirement for choosing the hash function used to generate the fingerprint FP.i is that it must be highly unlikely for a third party to generate a public key that hashes to that same value. One such hash function that is employed by the present invention generates a fingerprint FP.i equaling the 128 low-order bits of the public key pubkey.i. A process does not need to store its own fingerprint because it has access to its own public key and the hash function used to generate its fingerprint.

As described in reference to FIG. 3, data items 180-TM for each transport manager class include an agreed key (AK) 302 and a remote fingerprint (remoteFP) 304. For example, as shown in FIG. 5, the transport manager TM1 (in process A) includes an agreed key "AK.AB" 302-TM1, which is shared with the transport manager TM1' (in process B), and the fingerprint of process B, "FP.B" 304-TM1. As will be described below, a transport can use the fingerprint to re-establish communications with a process after a network interruption. Once they have negotiated an agreed key, the transport pairs use the agreed key to encrypt and decrypt their inter-process messages based on a single key encryption method, such as the Data Encryption Standard method, "DESO" 252. Alternatively, each of a pair of transport managers could have its own public and private keys and public key encryption and decryption methods that the transport manager uses to securely encrypt and decrypt inter-process messages.

In the embodiment of FIG. 5, because all security and inter-process message transmission functions are handled by the transport mangers TM, the individual objects do not have to be concerned with cryptography or where a particular object is located, which enables capability security to be provided for transparent distributed object systems. Encryption is only performed for inter-process object reference messages. All local messages are passed using language-level pointers with security provided by the operating system or the computer language.

The operation of the system of FIG. 5 is now described for the situation where an object passes an object reference for a co-located object to an object in a different address space, which situation is handled by a two-party method associated with the transport managers. This situation, shown in FIG. 5, largely proceeds as described in reference to FIG. 4, with the addition of encryption and decryption steps performed by the transport managers TM1 and TM1'.

As in FIG. 4, A1 initially issues the message B2.foo(A2), which is received by the proxy object B2' (recall, a proxy object is responsive to the same messages as its sibling). B2' relays this message to the transport manager TM1, which encrypts the corresponding network message (e.g., i(1).foo (A2Proxy(3)). The encrypted message i(1).(foo(A2Proxy (3)))$^{AK.AB}$ is then relayed by the transport manager TM1 to TM1'. The transport manager TM1' decrypts the received message, finds an object instance A2' of the class "A2Proxy" at the out-table index 3 in OT1' and issues the decrypted object reference message B2.foo(A2) to the local object B2. Of course if the proxy is not already present, the remote TM creates it. Once the message has been delivered, the proxy object A2' can be used by B2 (and other objects in process B) to issue messages to the object A2. Note that access to the proxy object A2' is limited according to the tenets of capability security to only those process B objects that know its reference (i.e., its out-table index, 3). Process B objects without this capability are prevented by internal language services from obtaining this reference. Other, remote, objects are also not able to obtain this reference due to the encryption and decryption that is performed by the transports TM1, TM1'. Thus, the system described in reference to FIG. 5 provides for the secure, transparent transfer of object references between objects in two different processes.

Another situation commonly arises where an object in a first address space (e.g., process A) needs to pass an object reference for an object in a third address space (e.g., process C) to an object in a second address space (e.g, process B). This situation is referred to as a third-party handoff. Due to the requirements of capability security, the object in the second address space (i.e., the object that is the intended recipient of the object reference message) cannot make use of the in-table and out-table index of the referenced object in the transport managers that coordinate communications and security between the address spaces of the sending and referenced objects. This is because slot indices are specific to the transport managers that maintain them and to objects in the corresponding processes that have the capability to access the objects associated with those particular slot indices. Furthermore, because there is no correspondence between the slot indices assigned by different transport pairs to objects, there is no guarantee or expectation that the slot index used by a particular pair of transport managers for one object would be used by another pair of transport managers for the same object. Thus, in the three process case, one way a meaningful object reference can be passed for a particular object is to use as the particular object's reference an invariant value that is associated with that object as long as remote references to the object exist. One system providing this capability uses a secret number maintained by a registrar object for each object in the registrar's address space as this invariant value. The present invention makes use of registrars and the secret numbers maintained by registrars to provide persistent distributed capabilities. How this is accomplished is now described in reference to FIG. 6.

Figure 6:
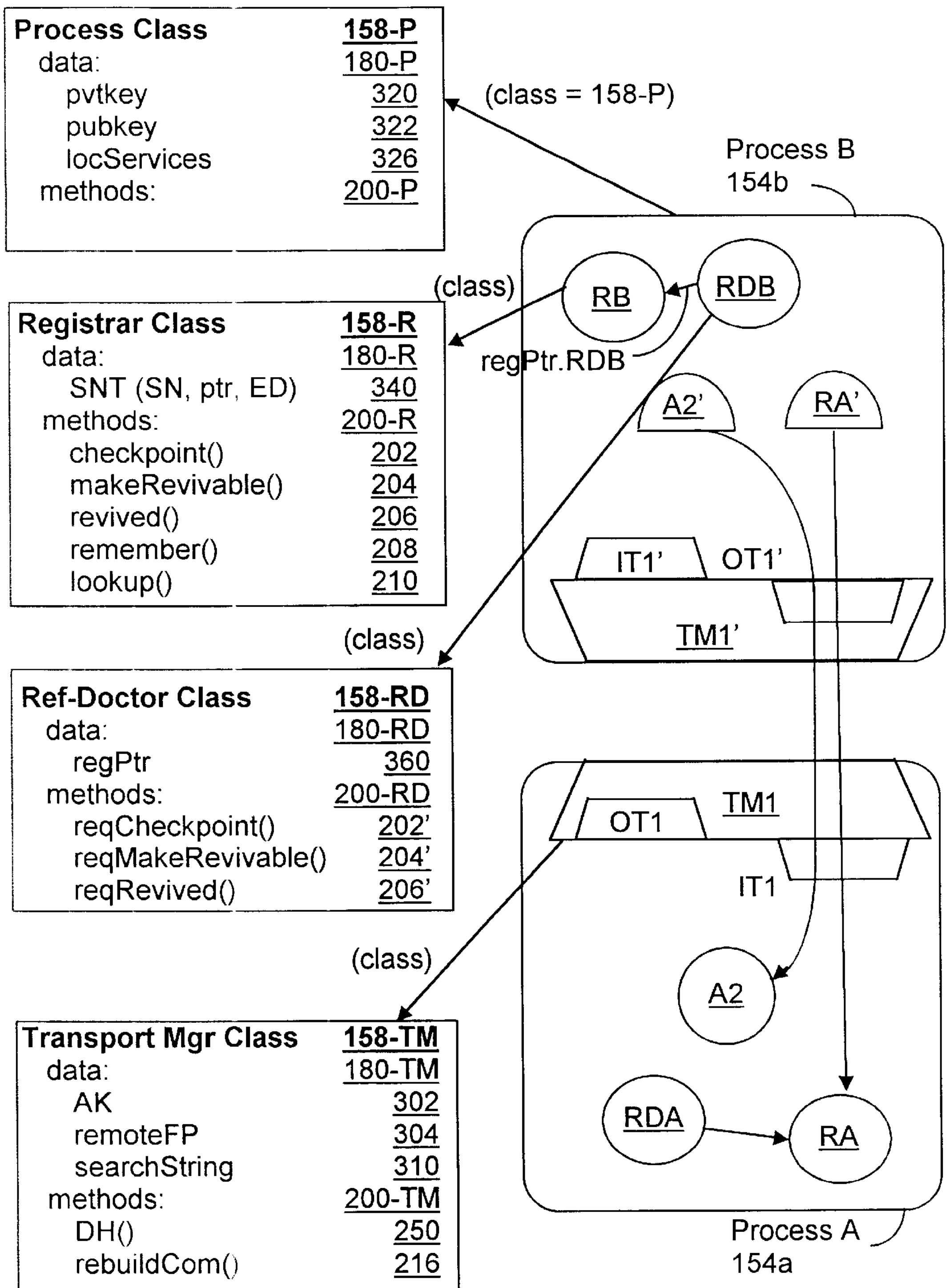
FIG. 6 is a depiction of the classes and organization of the objects of the preferred embodiment.

Referring to FIG. 6, there is shown a block diagram of a preferred embodiment of the present invention. This diagram shows details of a hypothetical distributed application that includes two processes: A 154*a* and B 154*b*, which communicate via a pair of transports TM1 and TM1'. For the remainder of this application, it is assumed that process A and process B are on separate machines. Process A includes a program object A2, a registrar RA and a ref-doctor RDA that holds a strong pointer to the registrar RA. Process B includes a proxy object A2', a registrar RB, a ref-doctor RDB and a registrar proxy RA'. The proxy A2' and the registrar proxy RA' are linked to their process A analogs through matched slots in the out-table OT1' and the in-table IT1. The characteristic data and methods associated with the classes of which these objects are instances are now described in reference to FIG. 6.

The process class 158-P has data structures 180-P that include a private key (pvtkey) 320 and a public key (pubkey) 322. In the preferred embodiment, the process data 180-P also includes a variable (locServices) 326 that sets out a list of one or more location service objects with which a process registers its location. As described below, the location service allows other processes to find and re-establish communications with processes that have moved. Thus, the object storage 160-PA for process A includes the following data 230-PA:

| Data 230-PA for Process A | |
|---|---|
| private key | pvtkey.A 320-PA |
| public key | pubkey.A 322-PA |
| loc services list | locServices.A 326-PA |

Similarly, the object storage 160-PB for process B includes the following data 230-PB:

| Data 230-PB for Process B | |
|---|---|
| private key | pvtkey.B 320-PB |
| public key | pubkey.B 322-PB |
| loc services list | locServices.B 326-PB |

The registrar class 158-R includes a random number generation method for generating unguessable secret numbers (i.e., practically unguessable given current computing power), which in the preferred embodiment are at least 64 bits in length. Each registrar also includes a remember method 208 that registers unique secret numbers for objects when there is a need for an inter-process reference for an un-registered object and a lookup method 210 that handles all inter-process communications directed to registered objects in its address space by a transport manager. Secret numbers are known only to the appropriate registrar and to objects that have the capability to access registered objects across address space boundaries, which preserves capability security for distributed objects.

The principle data item of the registrar class 158-R is a secret number table (SNT) 340, each entry of which is associated with a local, registered object j (meaning an object that is in the same process as the registrar) and includes a secret number (SN.j) for the object j, a strong pointer (ptr.j) to that object and an expiration date (ED.j) which gives a date after which information for the object j is no longer available should there no longer be live proxies to it. Thus, referring to FIG. 6, given that the object A2 is registered with the registrar RA, the object storage 160-RA for the registrar RA would include the following data 230-RA:

Data 230-RA for Registrar RA
Secret Number Table SNT-RA

| secret number | strong pointer | expiration date |
|---|---|---|
| SN.A2 | ptr.A2 | ED.A2 |

The registrar methods 200-R provided by the preferred embodiment include a checkpoint method 202, a makeRevivable method 204 and a revived method 206. The checkpoint method 202 is invoked with a checkpoint message. In executing the checkpoint method, the appropriate registrar object directs its host process to save in a non-volatile, checkpoint memory 155 all of its state data. Checkpointing an entire process ensures that the process's internal state is consistent when it is revived after a machine or process failure. The state data comprises everything that is reachable (through a chain of strong pointers) from persistent roots within the process. For the purposes of the present application, persistent roots are different from the roots of garbage collection and are defined according to the following principles:

(1) neither in-table nor out-table entries/pointers are persistent roots;

(2) secret number table entries that have secret numbers but not expiration dates or whose expiration dates are in the past are not persistent roots (such entries represent local objects involved in a three-party handoff or expired objects); and (3) the stacks used by the process's threads and global data are persistent roots, as are other roots of garbage collection that do not fall into the first two classes.

Examples of objects that can be check-pointed include program objects, such as A2 or A2', global variables 164 (FIG. 3) and the stacks 151 (FIG. 3), which store the current state of all threads executing in the host process on a particular machine. In the preferred embodiment, it is assumed that the non-volatile storage available for checkpointing is provided on slow, hard disk space, meaning that it is not affordable to store checkpoint data for a process before sending any messages outside the process, such as network messages. Thus, the preferred embodiment is designed so that key components of an interrupted process can be revived based on periodic checkpoints that may occur at intervals of time substantially longer than the interval between network communications.

The makeRevivable method 204 is invoked with a makeRevivable message including a reference to the proxy to be made revivable and an expiration date (ED) to be associated with that proxy's information. Making a proxy revivable means that following a communication interruption and a successful revival attempt, the ("dead") proxy's link with its corresponding remote object is re-directed to a new ("live") proxy, allowing inter-process communications to be resumed between the new proxy and the remote object. Should another revival be performed on the dead proxy while the live proxy is still live, the same live proxy is returned. In the preferred embodiment, it is possible to re-establish links between a dead proxy's successor proxy and its corresponding remote object following a communications break only if the proxy is first made revivable. The makeRevivable method executed in the proxy's process causes a corresponding remember message to be delivered to and executed by the remote process's registrar.

Upon receiving a remember message, if a secret number table entry does not already exist for the proxy's corresponding remote object, the remote registrar allocates a new secret number table entry including the object's secret number "SN" (generated by the registrar) and expiration date "ED" (provided in the message) and a strong pointer "ptr" to the designated object. If a secret table entry already exists for the designated object, the registrar merely updates that entry's expiration date ED to the expiration date set in the message if the new ED is greater than the existing ED. The registrar then returns the secret number to the sending process, which stores both in the proxy's out-table slot. The expiration date is not returned to the sending process, which knows that the actual expiration date for the remote object is at least as late as the requested ED. Note that an application program 156 determines which objects are to be made revivable.

The revived method 206 is invoked with a revived message including an object to be revived. Reviving a proxy involves re-building the communications link between the proxy and its remote counterpart. Typically the object to be revived is a proxy (e.g., A2'), so the revived operation involves re-establishing the link between the proxy and its corresponding remote object (e.g., A2). If the argument in a revived request is not a proxy, then it is necessarily a live local object, which is simply returned as the trivially revived version of itself. Similarly handled is a request for a revived version of a live proxy. A proxy can be revived only if it has previously been made revivable. Upon receiving a revived message, a registrar issues a network revived message to the appropriate remote registrar designating the secret number of the object to be revived and a transport manager slot index to be associated in the processes with a temporary "hole object" and "hole proxy" (see FIG. 7A). Upon receiving the network revived message, the remote registrar returns the slot index of the remote object to the first registrar via the hole proxy and hole object, after which communications can be resumed between the revived proxy and its remote counterpart.

In the preferred embodiment, access to registrars is restricted in order to enable the additional security property of capability confinement. To control registrar access, the preferred embodiment provides a class of objects called ref-doctors, such as the object RDA in process A and the object RDB in process B.

Figure 2:
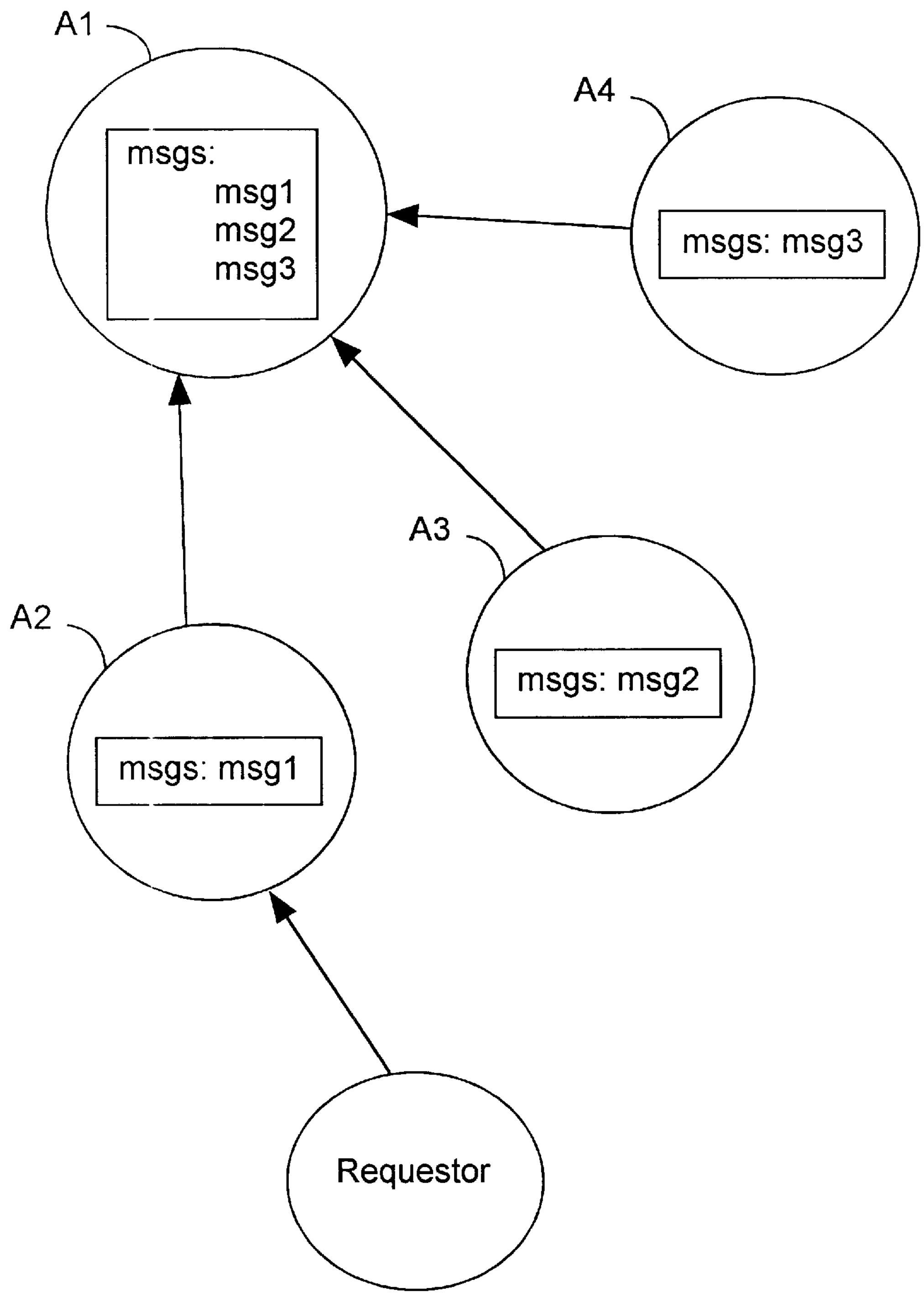
FIG. 2 is a depiction of a prior art implementation of capability security that makes use of front-end objects.

In the preferred embodiment, the purpose of a RefDoctor object is to be a front-end object for the more powerful Registrar object, in just the way A2 is a front-end object for the more powerful A1 in FIG. 2. Since the Registrar is already an object we are content to make available to untrusted processes on the network (since it is always implicitly associated with in-table slot number zero), why would we wish to further subset its powers? To answer this question, we must distinguish between two classes of mistrust—confined and unconfined.

A confined agent is one which can only send information or capabilities to other agents in ways that have been authorized by its confiner.

An unconfined, mistrusted agent is one in which others can have no confidence regarding which other unconfined agents it may or may not be able to communicate with. If an object has a secret that it wishes to keep secret, that object should not hand it to an unconfined agent that the object does not trust not to pass it on. Similarly, if an object holds a capability that it wishes to deny to certain unconfined agents, that object should not hand it to other unconfined agents that it does not trust not to transmit that capability to those they shouldn't. Processes executing on unknown machines on open networks are a good clear example of agents most likely to be deemed unconfined.

A confined, mistrusted agent is one that is executing code whose logic is not trusted, but which is executing in a context that prevents the mistrusted code from communicating over channels other than those that are known and are approved of. The prior art includes papers on the subject of confinement (e.g., see Butler Lampson, "A Note on the Confinement Problem," Communications of the ACM, Vol. 16, No. 10, 1973). Often, this execution context also provides for the forcible termination of the confined program, which the confined program would have no ability to prevent.

If we further distinguish between communications channels that can convey both bits (information) and capabilities (a capability itself is an example of such a channel) from communications channels that can only convey bits (such as a TCP connection), we can distinguish between capability confinement and full confinement. A program that is fully confined but which is executing code that is not trusted can be given both secrets and precious capabilities and it will it not be able to communicate them further. Capability confinement alone doesn't give any assurance that general secrets won't leak out, but does ensure that capabilities won't.

Full confinement is strictly superior to capability confinement, so why engineer systems that provide only the latter? Unfortunately, as Butler Lampson pointed out in "A Note on the Confinement Problem", it is very hard to prevent two determined misbehaving programs executing on one system from successfully communicating bits. The means he pointed out have since become known as "wall banging" from the imagery of prisoners, locked in separate cells to prevent communication, nevertheless communicating by banging on the walls. (The issue is also known as preventing the use of "covert channels".) In the software context, the confined program could cause variations in various loads, such as disk-paging behavior, that its listening co-conspirator knows how to decode into the secret it should never have known.

Since networks only convey bits, at some level of implementation distributed capabilities have to be represented as bits. The ability to turn capabilities into bits (via the Registrar's "remember" message 208) is used in this embodiment for the first part of the three party handoff and to make proxies revivable, both described above, and the ability to turn bits back into capabilities is used (via the Registrar's "lookup" message 210) in the last part of the three party handoff and to get revival versions of dead proxies.

The capability confinement problem is comparatively easy to solve, as is demonstrated by the many computer languages with true encapsulation and unforgeable pointers (e.g., Actors, Scheme, Joule, Java). On a platform which has reliably solved only the capability confinement problem, there would be a real problem if a reference to the Registrar were provided to untrusted capability-confined code. The capability-confined code could simply ask its Registrar to "remember" a capability it wishes to convey and then "wall-bang" the resulting secret number through a covert channel to a co-conspirator, who can then simply do a "lookup" in that Registrar to obtain that capability. Providing full confinement is possible but is very difficult and expensive. On a platform providing full confinement, the Registrar/RefDoctor separation of the present invention serves no purpose, but neither does it hurt. Consequently, the present invention is compatabile with platforms that provide full or capability confinement.

By separating the Registrar from the RefDoctor, on platforms which only provide capability confinement one can set up one or many computational contexts for untrusted capability-confined code to execute in, giving them access to proxies for remote objects, and giving them access to the RefDoctor so that they may deal with the distributed failure issues that may arise. However, this same code may be denied access to the Registrar or any other means of converting between bits and capabilities.

Even though the RefDoctor operations cause the manipulation and storage of secret numbers, the capability-confined code that is calling these operations can never find out what these secret numbers are, and so cannot divulge them. However many bits it may "wall-bang" through covert channels to its co-conspirators it cannot transmit a capability, or, because it does have access to them, the bits that could be turned into a capability.

By wielding the capabilities it does hold according to instructions it may receive through covert channels, it can provide to its co-conspirators many of the benefits they could have obtained by holding the confined capability. However, there are two ways in which the preferred embodiment clearly denies them the full power equivalent to holding the capability:

1. If the confined agent can be terminated at the choice of the confiner, then the benefits derived from the capability are reliably denied to the co-conspirator after this point.
2. If the confined capability needs to be brought together with another capability held by the co-conspirator to bring about certain effects, capability confinement denies the co-conspirator the ability to bring about these effects.

Returning to our imagery with an example, if one of our prisoners is given access to a can-opener and another is given access to a can, they cannot jointly succeed at opening the can no matter how well they communicate to each other about the can and can-opener.

The ref-doctor class 158-RD has data structures 180-RD that include a strong pointer (regPtr.RD) to its local registrar and has methods 200-RD that include: reqcheckpoint 202', reqMakeRevivable 204' and reqRevived 206'. Each ref-doctor acts as a front end object to its local registrar, meaning that a ref-doctor acts as an intermediary between local objects and the local registrar.

For example, referring to FIG. 6, the ref-doctor RDB (like all other unconfined objects) can directly reference the process B registrar (via the strong pointer regPtr.RDB). Confined objects gain access to the local registrar's methods by issuing an appropriate message invoking the ref-doctor method that corresponds to the desired registrar method.

Generally, when one of these messages is invoked, the receiving ref-doctor simply issues the appropriate corresponding message to the registrar, which invokes its method and, if appropriate, returns a value to the ref-doctor. The ref-doctor then returns the returned value to the local calling object. Thus, if a program 156.X (not shown) in process B wants to make the proxy A2' revivable, the program 156.X invokes the ref-doctor RDB's reqMakeRevivable method 202', upon which the ref-doctor RDB issues a makeRevivable message to the registrar RB. The registrar RB then executes its makeRevivable method 202 for the proxy A2'. In this way, confined objects are able to invoke registrar methods without gaining access outside the bounds of capability security to objects registered with a registrar.

As in the systems of FIGS. 4 and 5, the preferred embodiment makes use of transport managers to handle inter-process communications. In addition to the data 180-TM and methods 200-TM already described in reference to FIG. 1, the TM class 158-TM has data structures 180-TM that include a remote fingerprint variable (remoteFP) 304, which holds the fingerprint of the process to which a TM object instance is linked, and a search string (searchString) 310, which holds a list of location services. Thus, for the situation shown in FIG. 6, where the transport managers TM1' and TM1 link the processes A and B, the object storage 160-TM1' includes the following data 230-TM1':

| Data 230-TM1' (Process B) | |
|---|---|
| remoteFP | = FP.A 304-TM1' |
| searchString | = locServices.B 310-TM1' |

Similarly, the object storage 160-TM1 includes the following data 230-TM1:

| Data 230-TM1 (Process A) | |
|---|---|
| remoteFP | = FP.B 304-TM1 |
| searchString | = locServices.A 310-TM1 |

The transport manager class 158-TM also has methods 200-TM that include rebuildComo() 254 which can be invoked by one of the programs 156 needing to re-establish communications with another process with which it was formerly communicating. When executing this method, a transport manager object TM issues a request for the designated process, identified by its "remoteFP" value, to each of the location services listed in the "searchSting" until the other process' new location is returned. All of these messages are encoded so that neither the fingerprint nor the location of the designated process are discoverable by eavesdroppers. Once the remote process is located, the transport managers re-negotiate a new agreed key for subsequent communications between their respective processes. Note that the rebuildCom method 254 can be called on demand (the first time a program does a "revive" on a revivable dead proxy) or immediately, as soon as communication might be re-re-established. Of course, in either situation, inter-process communications cannot be rebuilt until both processes are running and the communications channel has recovered from any fault.

Figure 7A:
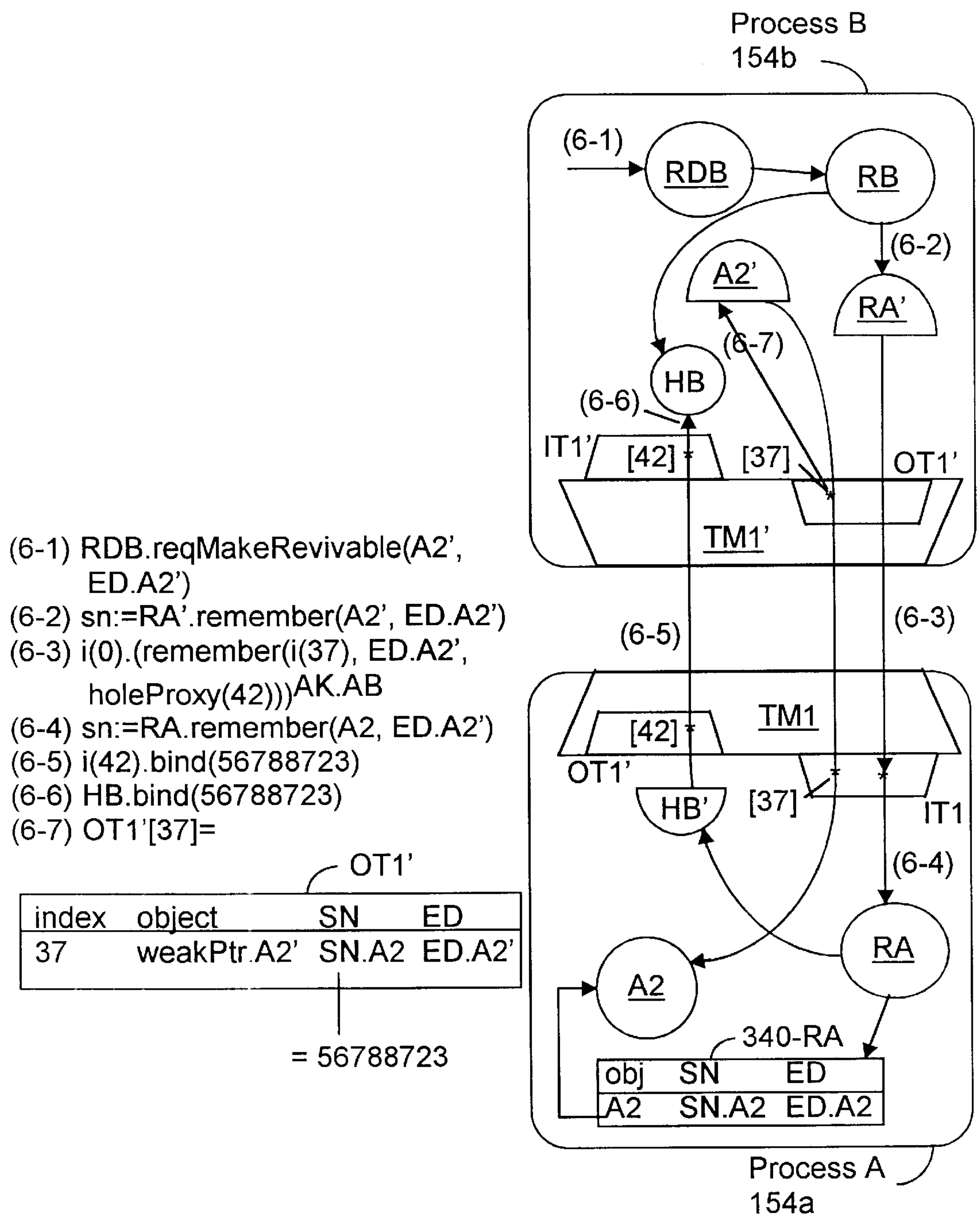
FIG. 7A depicts the series of messages invoking object methods of the preferred embodiment that makes revivable the proxy object A2'.
Figure 7B:
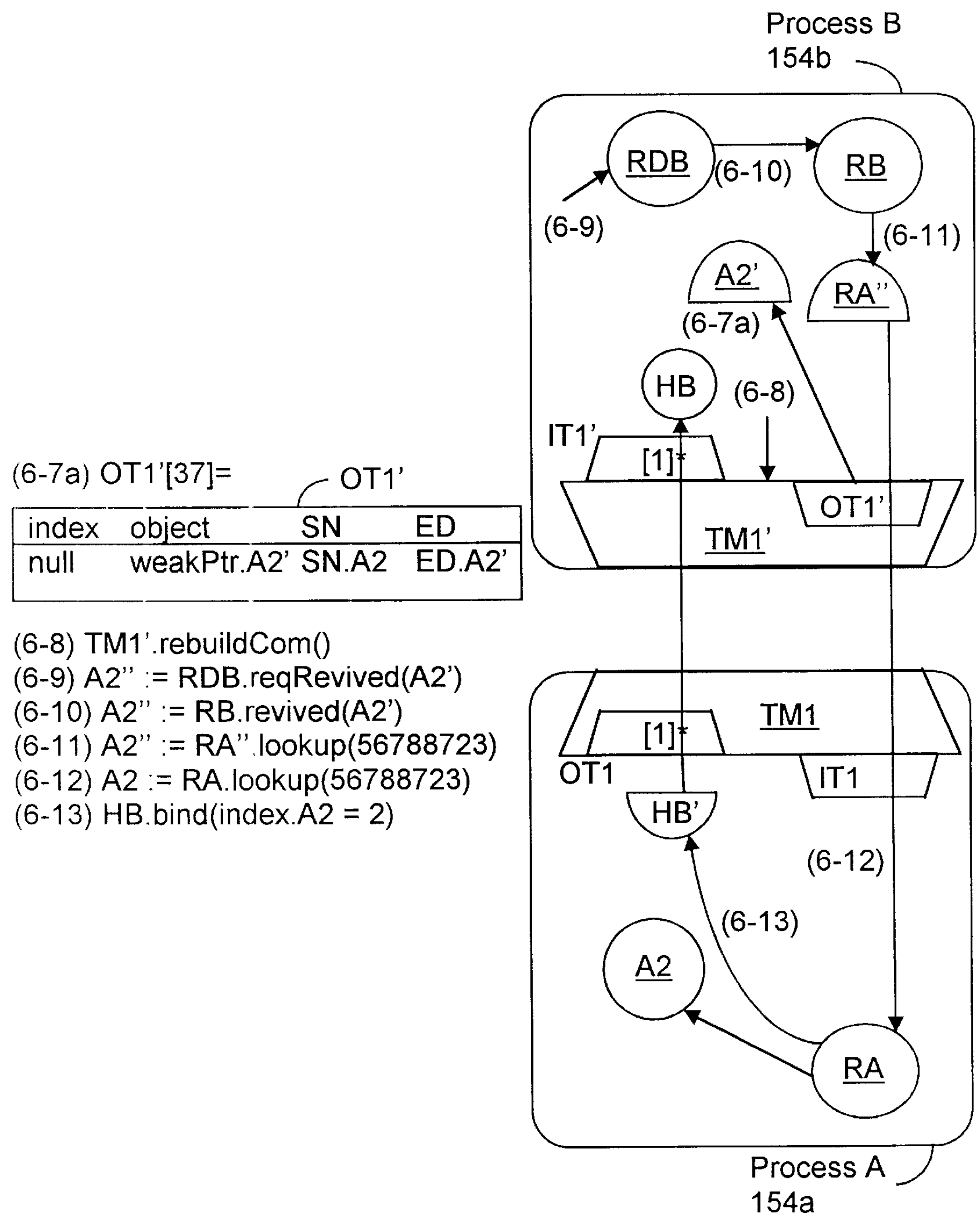
FIG. 7B depicts a situation where the communications channel between two processes A and B has been interrupted, and the series of messages invoking object methods of the preferred embodiment that rebuilds the communications channel between the two processes and revivable objects.
Figure 7C:
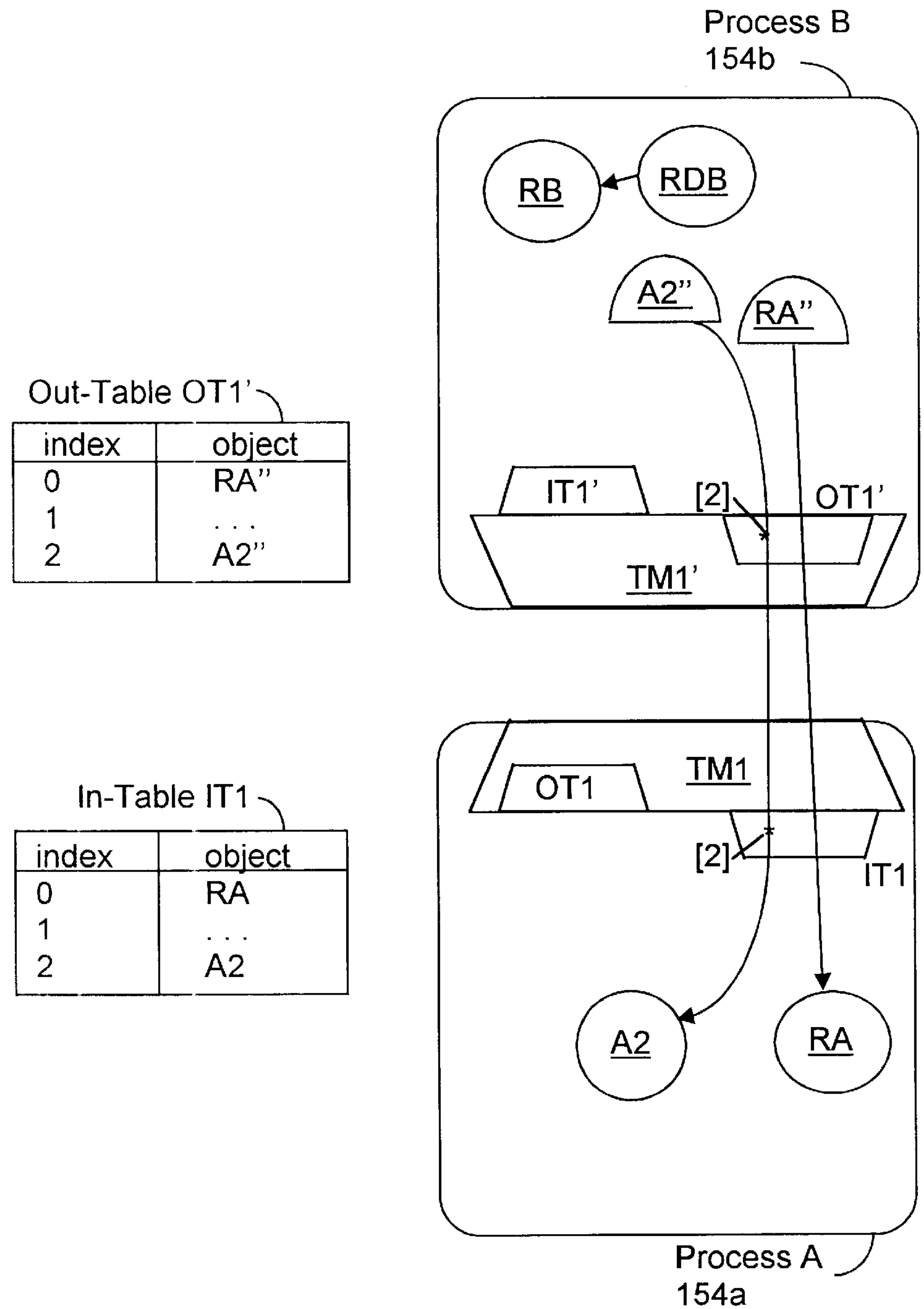
FIG. 7C depicts the situation where communications have been rebuilt between the processes A and B and the objects A2' and A2.
Figure 8A:
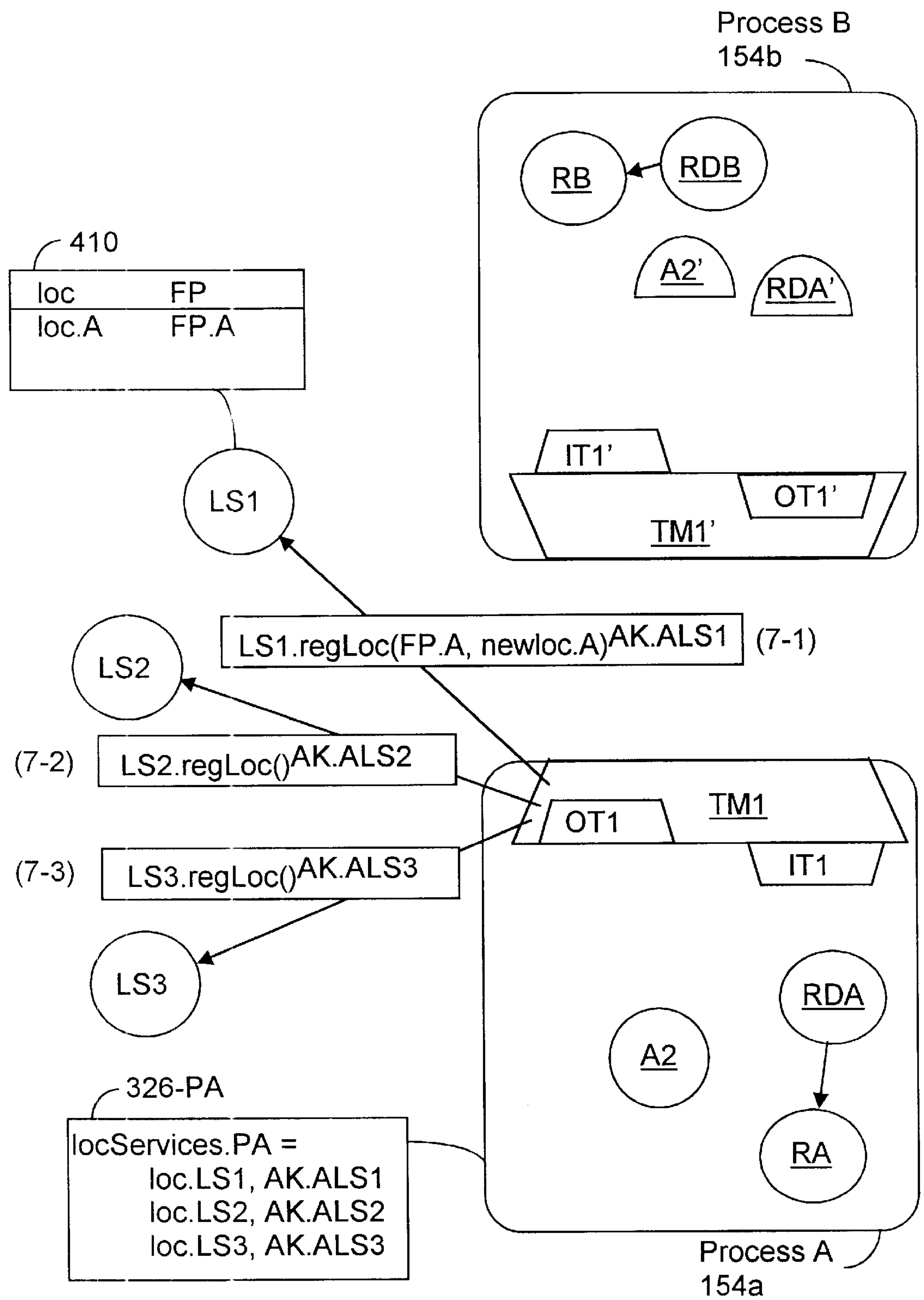
FIG. 8A depicts the messages and data structures used by a process to register its location with a set of location services.
Figure 8B:
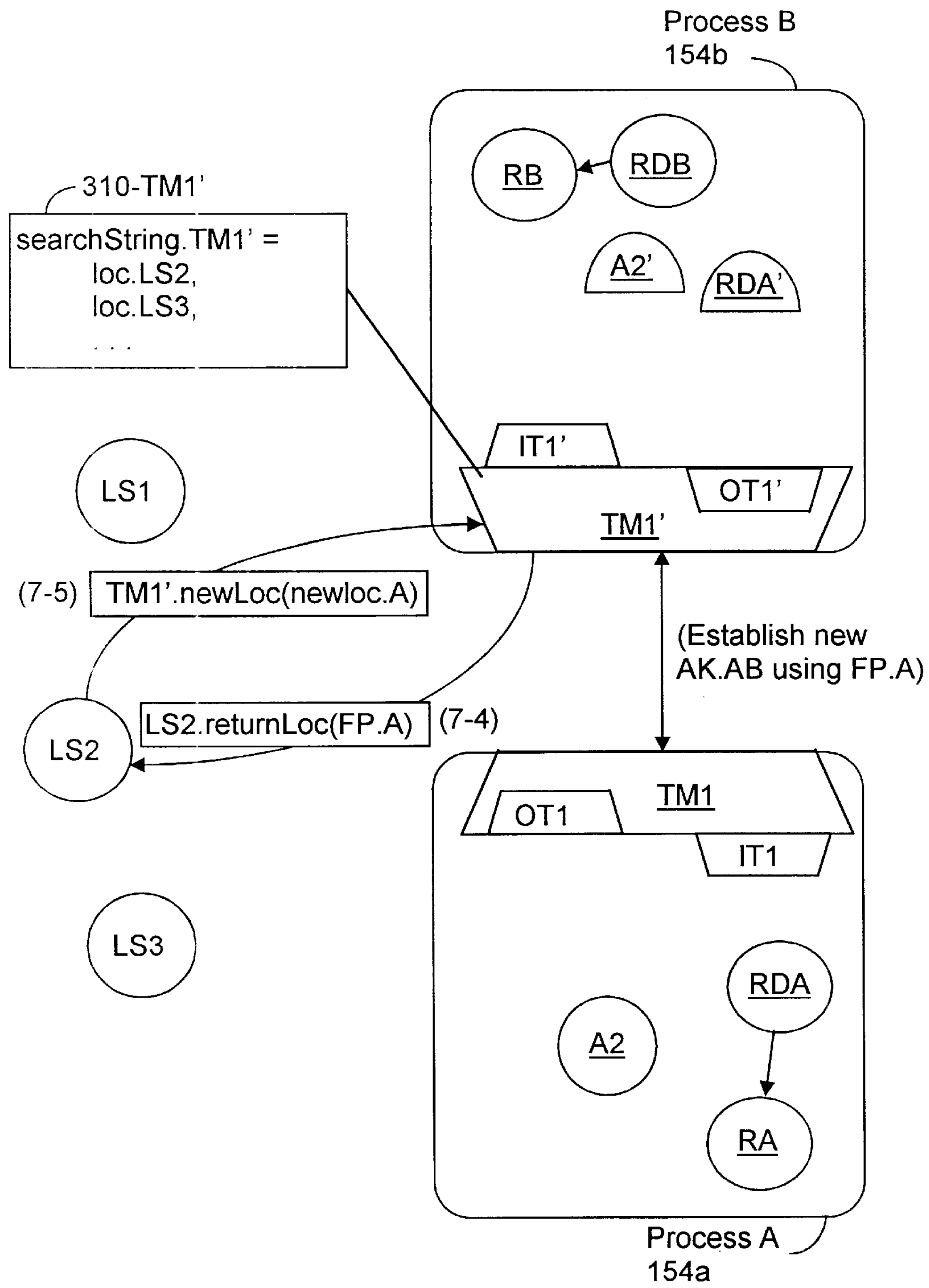
FIG. 8B depicts the messages and data structures used by a process to locate a process that has been moved following a communications interruption.

The detailed operation of the registrar and transport manager methods 200-R and 200-TM are now described in reference to FIGS. 7 (consisting of FIGS. 7A, 7B and 7C) and 8 (consisting of FIGS. 8A and 8B).

Referring to FIG. 7A, there is shown the sequence of messages by which the proxy object A2' is made revivable. This figure also depicts the state of two processes A and B that are communicating via the transport managers TM1' and TM1. The object A2 in process A is made accessible to the process B objects via the proxy A2', which shares with A2 a slot index of 37 (indicated by the notation "[37]") in the in-table IT1 and the out-table OT1'. Note that the out-table OT1', which is representative of all out-tables, includes two additional fields, SN (short for secret number) and ED (short for expiration date). These fields are used to make proxies revivable, as is described below. As in FIG. 6, each of the processes has a registrar (RB and RA) and a ref-doctor (RDB and RDA). Process B also includes a registrar proxy RA' that is linked to the process A registrar via the fixed slot reserved in all transports for registrars. Also shown in FIG. 7A are a hole object HB and a hole proxy HB' which are used by the process A registrar RA to return A2's secret number to the registrar RB.

As a first step in making the proxy object A2' revivable, an object in process B issues a reqMakeRevivable message 6-1 addressed to the RefDoctor RDB; which message at the language level can be represented as "RDB.reqMakeRevivable(A2', ED.A2')", where ED.A2' is the requested expiration date. This message asks that the proxy be revivable at least until that date. The RefDoctor RDB simply translates the message to a makeRevivable( ) message to the Registrar RB. In response, the Registrar's makeRevivable method first examines the proxy A2' to obtain a proxy RA' for the Registrar RA of the process hosting the object A2 that the proxy A2' designates. The Registrar RB then issues a remember message 6-2 to this RegistrarProxy RA'. The remember message can be represented at the language level as "sn:=RA'.remember(A2', ED.A2')", where "sn" represents the secret number of A2 that is returned by RA.

The proxy RA' (together with its Transport Manager TM1') then issues the network level message 6-3, which can be represented as "i(0).remember (i(37), ED.A2', HoleProxy (42))", where

- "i(0)" necessarily designates the Registrar RA in the receiving process, given that zero is the index number reserved for that purpose;
- "37" is the out-table/in-table slot number reserved respectively in process B/A for proxy A2'/object A2;
- "ED.A2'" stands for the expiration date; and
- 42 is the in-table/out-table slot number reserved respectively in process B/A for the Hole HB/HoleProxy HB'.

The HoleProxy argument is the means by which language level call-return messages are turned into network level one-way messages. In this case, the Hole HB is the means by which the caller receives the resulting secret number. The thread in the calling process waits on Hole HB until this number appears.

When the Transport Manager TM1 in process A receives the message 6-3, it decodes it and issues the language level message 6-4, which can be represented as "sn:= RA.remember(A2, ED.A2')". The Registrar RA, on receiving this message, sees if it already has this object in its secret number table 340-RA. If it does, it stores into that entry in the secret number table 340-RA the later of the expiration date stored there and the one (ED.A2') in the request. If the object was not in the secret number table, the registrar RA uses its random number generator to generate a new secret number (SN.A2), and then stores the object in the table with this secret number SN.A2 and the requested expiration date ED.A2'. In either case, it returns the secret number associated with this object as the return value 6-5 of the language-level remember message 6-4. The Transport Manager TM1, on receiving the result of the remember message, sends the network message 6-5 which can be represented "i(42) bind (56788723)", where 42 is the example index already associated to the Hole HB, and 56788723 is the secret number for A2. It is essential, of course, that the network message containing the secret number be protected from eavesdropping. In the preferred embodiment, all network messages are encrypted.

The Transport Manager TM1', on receiving this message 6-5, looks up the Hole object HB in its in-table, and sends it a language level message 6-6 that can be represented as "HB.bind(56788723)". The Hole is now bound to this value (the "hole is filled in"), and the thread waiting for this to happen can continue. This thread, as we saw above was executing within the remember method of the proxy RA'. The remember method now returns, returning the secret number SN.A2 to its caller, which was executing in the makeRevivable method of the Registrar RB. The Registrar RB, having found that the remember message completed successfully, now updates the out-table entry for the proxy A2' in the Transport Manager TM1'. As shown in FIG. 7A as step 6-7, into this out-table entry the Registrar RB stores the secret number it received (SN.A2), and the expiration date it requested (ED.A2'). Even though RB received no expiration date back, because the request completed successfully, it knows that the actual expiration date for the object A2 is no earlier than the expiration date that was requested. Once these two values are stored in the out-table entry, the proxy A2' has been made revivable. An alternate implementation which is equally reasonable is for the remember message to return both a secret number and the actual expiration date (which may be later than the requested one), and for the Registrar RB to store these in the out-table entry for A2'.

Following the execution of these steps, the state 6-7 of the out-table OT1' is as depicted below:

| | Data 230-TM1' (Process B) Out-table OT1' | | |
|---|---|---|---|
| index | object | secret number | expiration date |
| 37 | weakPtr.A2' | SN.A2 | ED.A2' |

The proxy A2' is now revivable because it has a secret number identical to that of A2 and an expiration date that is no earlier than of A2, meaning that upon the occurrence of a communications interruption, the proxy A2' can easily be re-linked with its remote analog A2. The way in which a connection between a proxy and its counterpart object is revived following a network partition or other communications interruption is now described in reference to FIG. 7B.

FIG. 7B depicts the state of processes A and B following a network disruption, which could have been a temporarily failure of one or both of the machines hosting processes A and B or a network partition. As soon as a transport manager TM becomes aware of a communications problem (meaning any problem that is likely to result in an inconsistent processing state with its counterpart process), it nulls out selected data 230-TM (i.e., its in-table IT and agreed key AK) within itself, which renders all other communications with its linked process temporarily impossible. Thus, in the situation of FIG. 7B, the in-tables IT1, IT1' would initially be completely empty, the agreed key used by the transports TM1 and TM1' would be nulled out and the underlying data stream (e.g., a TCP stream) closed. However, note that the out-tables OT, the remote fingerprint remoteFP.TM and the search string searchString.TM are not deleted as this information is needed for revival.

In the preferred embodiment, revival of the communications can be initiated in one of two ways. The first way is to attempt to rebuild inter-process communications as soon as possible after a reqRevived message 6-9 is issued by the controlling program requesting the revival of a particular object. The transport manager then executes its rebuildCom method 216. The second possibility is to allow the controlling programs to initiate revival without waiting for a request when they notice that the problem has cleared.

Upon being notified of a need to rebuild communications (either via a reqRevived message 6-9 or a rebuildCom message 6-8), the transport manager TM1' issues a message directed to the last known machine hosting process A asking the process with the fingerprint FP.A (i.e., process A) to return its public key pubkey.A. Assuming process A had not been re-located (this situation is discussed in reference to FIGS. 8A and 8B), process A would then return its public key pubkey.A to process B, which uses the fingerprint FP.A and the appropriate hash function to verify that the returned number, should it prove to be a public key, is indeed the public key that corresponds to the fingerprint of process A. Once process B has verified process A's public key, the two processes can establish their Diffie-Helman agreed key AK.AB as already described; these steps are not illustrated in FIG. 6-2. The success of the Diffie-Helman procedure establishes that the retrieved number was indeed a public key and, therefore, the public key of A.

If an application program that encounters a dead proxy is prepared to deal with the inconsistencies this indicates (loss of messages or regress of state of either itself, the process hosting the object the proxy designates or both) it can attempt to recover by asking its RefDoctor for a corresponding revived proxy. For example, in the situation of FIG. 7B, this request can be represented by the language level message "A2":=RDB.reqRevived(A2')". (6-9), which message the RDB forwards on to its Registrar RB as the language level message "A2"=RB.revived(A2')" (6-10). If the connection with the other process is down at that time, this action will cause it to be rebuilt. Once the connection has been rebuilt (whether in response to this request or not), the Registrar RB looks up a new live proxy RA" for the Registrar of the process hosting the object A2 designated by the dead proxy A2'. From the dead proxy's out-table entry RB picks up the secret number of A2 (SN.A2), and issues a lookup message 6-11 to RA", which can be represented at the language level as "A2":=RA".lookup(56788723).

The message 6-11 is transformed into an equivalent network message directed to process A and then, within process A, to a corresponding language level lookup message 6-12, as described in reference to FIG. 7A. In response to the language level lookup message 6-12, the registrar RA looks up the object, if any, in its secret number table registered at that number (i.e., SN=56788723). Should it find such an object, the registrar RA returns the object's new index number in the in-table IT1 to the hole HB (step 6-13) in the manner described above in reference to FIG. 7A. In the situation illustrated in FIG. 7B, this index is "2", which is different from the old OT1'/IT1 index associated with A2' and A2. Upon the index being bound to the hole HB, the waiting thread executing within the registrar's revived method notifies the registrar RB, which then updates the out-table OT1' information at the new out-table index (i.e., 2) as described in reference to FIG. 7A.

Should another part of the same process B also find itself holding dead proxy A2' and try to recover, it will end up with the same A2" live proxy, since the first request caused A2 to be associated with an in-table entry in the live Transport Manager in process A used to talk to B, and A2" is the proxy at the corresponding live out-table index. The existing mechanisms for passing object references over the network thereby ensures that the second lookup request's returning of the same object reference will result in the same live proxy.

Application program logic that encounters a dead proxy but is not specially written to deal with the inconsistency issues, as is expected to be true for the vast majority of code, would simply attempt to send a message to the dead proxy. The behavior of a proxy object when dead, in response to a message, is to simply raise an exception back to its caller. The calling code, not having been written to be specially prepared for this circumstance, would not catch this exception, and would therefore in most programming languages be terminated. This termination process would proceed to the caller's caller etc, until reaching code that did catch this exception, or failing that, terminating this thread of execution within its process. This is all in accord with standard computer practice of building "fail stop" components. If a failure happens that a component does not know how to recover from, it is terminated rather than being allowed to proceed forward in a confused state, from which it might cause damage.

Were dead proxies instead revived in place, this fail-stop property for independent components sharing one proxy would be lost, as the recovery action by one component would leave the shared proxy live, such that the second component would be able to proceed forward, in ignorance of the inconsistency issue that must first be dealt with.

Referring to FIG. 7C, there is shown the outcome of the "revived" method. In this figure, the proxy A2" and its analog object A2 are linked via the transport managers TM1' and TM1 via a common slot index of 2, which is different from the index used by the earlier proxy before their inter-process communications were interrupted. Also, the registrar proxy RA" and registrar RA are linked via the reserved slot index of 0.

As mentioned above, in some situations, after a communications interruption, the process hosting an object to be revived will have been re-located to another machine. In such a situation, when executing its rebuildCom method 216, a transport manager attempts to locate the process and then, once it has tentatively located the process, verify that it is indeed the process to which it was formerly linked. This process is now described in reference to FIGS. 8A and 8B.

Referring to FIG. 8A, there is shown a situation where a network partition has occurred between the processes A and B and, before the connection between A and B was revived, process A was re-located to another machine. As described in reference to FIG. 7A, once a partition has been repaired one of the programs 156 executing in a process affected by the partition causes a local transport manager to rebuild communications with its corresponding transport manager in a remote process. Normally, the local transport manager is able to re-establish communications with the remote process at the same machine on which the process was executing before the partition. Of course, in some situations, processes are re-located (as was process A in FIG. 8A). To allow communications to be restored in this situation, the preferred embodiment provides two mechanisms, which are now described in reference to FIGS. 8A and 8B.

Referring to FIG. 8A, the preferred embodiment provides one or more location services (LS1, LS2, LS3), each storing in a process location table 410 the machine address and fingerprint of one or more processes. For example, in FIG. 8A, the location service LS1, wherein process A is registered, includes a table record 410-1 listing process A's location, "loc.A" and fingerprint, "FP.A". The location services with which a particular process is registered are listed in that process's locServices data structure 326, each entry of which includes a location service's address and the agreed key that was negotiated with that location service. For example, in FIG. 8A, process A's location services list, "locServices.PA" 326, includes records for LS1 (location=loc.LS1), LS2 (location=loc.LS2) and LS3 (location=loc.LS3). Note that a location service LS does not need to store an agreed key because it need not maintain an active communications link. Rather, it is quite common for a location service LS to store the location of many processes with which it only had the momentary communications necessary for the processes to notify the location service LS of their locations.

Whenever a process is re-located, that process registers its new location with as many as possible location services listed in its locServices data structure using a register location message (regLoc). When a process 154 registers with a location service (LS), the process 154 provides the LS with its public key (from which the LS can compute the fingerprint). The LS then uses the public key to compute an agreed key AK using a key exchange protocol (e.g., Diffie-Helman). The LS and the process 154 then open a secure communications channel using the agreed key. This allows the process 154 to demonstrate to the LS that it is the owner of the public key (i.e., it knows the private key that corresponds to that public key). The process 154 then informs the LS using a "regloc" message (short for register location) of the location ("newLoc") where it can be found. The LS stores the fingerprint FP and the location in a table 410. Each regLoc message is encrypted with the appropriate agreed key AK. For example, designating process A's new location as "newLoc.A", the register location message 7-1 issued by process A to the location service LS1 can be represented as "LS1.regLoc(FP.A, newloc.A)$^{AK.ALS1}$". The other register location messages 7-2, 7-3 to LS2 and LS3 are similarly formed. Given that a process has registered its location, the process that is trying to connect should be able to find the moved process using the stored search string 310 for the moved process whenever its rebuildCom method 216 is invoked. How this is accomplished by process B with respect to the moved process A is described in reference to FIG. 8B.

Referring to FIG. 8B, the transport manager TM1' in process B has a search string "searchString.TM1" 310-TM1 that includes one or more records setting out the network location of each location service that could hold the location of process A. In the preferred embodiment, the searchString contents are provided by the paired process while both objects are linked and communicating. Alternatively, transport managers are created with a default list of network sites in which process locations are maintained. Thus, when two processes do not wish to take the time to exchange the addresses of their location services, they can register and find address in the default set of location services. As shown in FIG. 8B, searchString.TM1 lists the locations of the location services LS2 (loc.LS2) and LS3 (loc.LS3).

Upon having its rebuildComm method 216 invoked and discovering that it cannot find its paired process at its last location, a transport manager issues a series of return location (returnLoc) messages to the location services whose addresses are included in its searchstring. Each of these messages includes the fingerprint of the process whose new location is desired. The receiving location service then returns the address of the process whose stored fingerprint (in the process location table 410) matches the provided fingerprint. The transport manager discontinues sending return location messages once it receives the new location of its former linked process and proceeds to contact the linked process with the fingerprint, verify the identity of that process (see discussion in reference to FIG. 7B) and negotiate a new agreed key with that process.

Thus, referring to FIG. 8B, the transport manager TM1' issues a returnLoc message 7-4 to the location service LS2, represented as "LS2.returnLoc(FP.A)". In response, LS2 returns the new location of process A. Upon receiving the new location, TM1' is able to contact process A and, using its stored remote fingerprint for process A (remoteFP.A), re-negotiate a new agreed key "AK.AB" that will subsequently be used by TM1 and TM1' to encrypt and decrypt all messages between process A and process B. Once contact is reestablished, the proxy can be revived.

Figure 9:
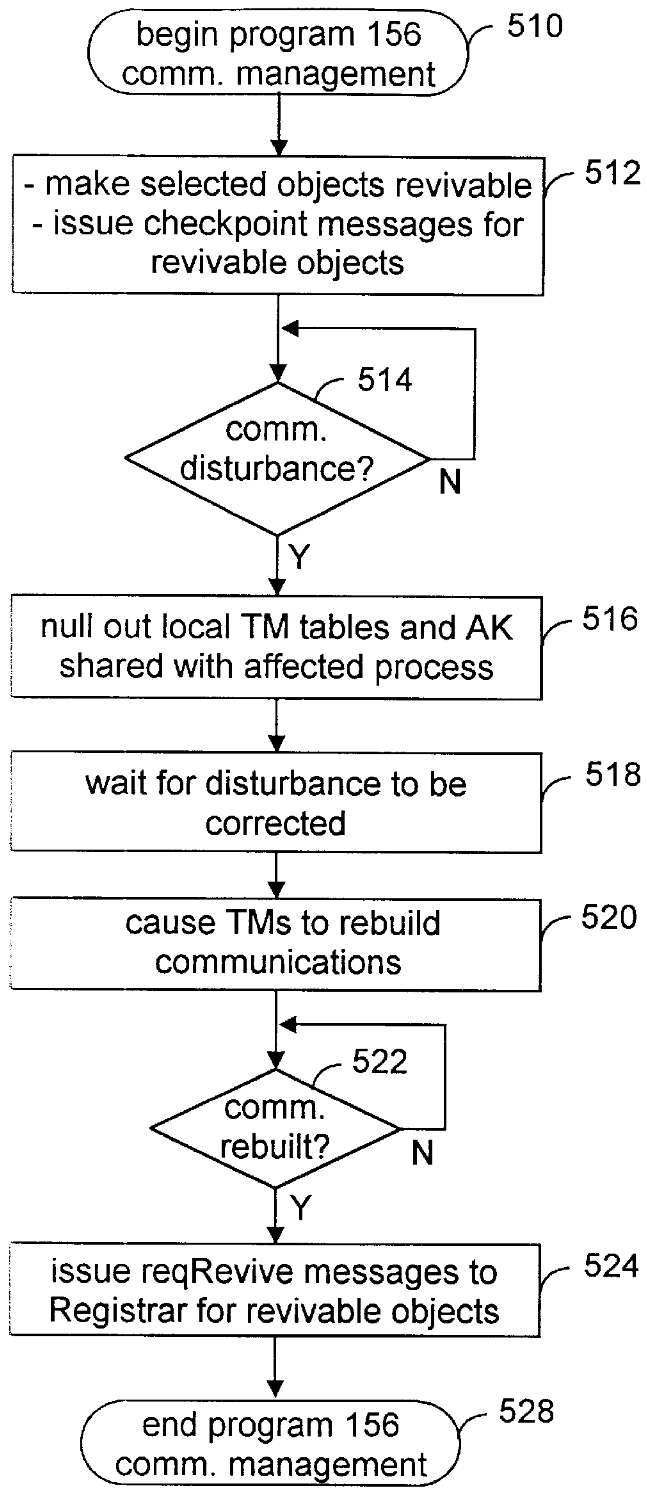
FIG. 9 is a flow chart illustrating the steps performed by an application program operating in accordance with the method of the preferred embodiment.

Having described details of the transport manager, registrar and ref-doctor methods, the process by which these methods are invoked by a program 156 implemented in accordance with the preferred embodiment is now described in reference to FIG. 9.

A distributed, object-oriented program 156 operating in accordance with the present invention incorporates a communications management procedure that invokes the previously described methods. The steps of this procedure are not transparent as the objects checkpointed and made revivable depend on the nature of each respective program 156. However, as part of its communications management procedure, each program 156 will execute the same basic steps. These steps are described in reference to FIG. 9 as a program flow with a beginning (510) and an end (528); however, in reality, these steps will more often than not be executed independently.

The first step is to make selected objects revivable using the reqMakeRevivable method 204 and then to checkpoint the state of the processes hosting those objects at critical points following key operations or at some regular interval (512). How these steps are implemented is described in reference to FIG. 7A. Having made the selected objects revivable, the program 156 is prepared to revive those objects and their inter-process communications channels following a communications disturbance affecting either the relevant processes or the network linking the machines hosting those processes (514). Upon the occurrence of a communications disturbance (514-Y), the transport manager TM nulls out all tables and data (i.e., the agreed key) being used by the transport managers to communicate via the degraded channel with their corresponding remote transport managers (516) other than that needed for revival. This prevents any latent messages from being transmitted between the processes while the soundness of the communications channel and consistency of the program's processing state is questionable. Note that the old Transport Manager for the severed connection is not reused when a new connection is built. Rather, a new Transport Manager is built for the new live connection. Not all of the information in the old Transport Manager is wiped-out when a connection is severed. The information that is retained includes the fingerprint, the search path, and the out-table (now holding on to dead proxies). It is necessary that the out-table be retained as it contains the information needed to revive the proxies.

Upon learning that the channel disturbance has been corrected or after a predetermined waiting interval (518) or when program logic encounters a dead proxy and attempts to revive it the controlling program 156 causes the affected local transport managers to rebuild their communications (520). The program 156 can do this by issuing a reqRevived message for a local proxy or by issuing a rebuildCom message. In response, respective ones of the local transport managers attempt to rebuild their communications channel with their corresponding remote transport manager. As described in reference to FIGS. 7B, 8A and 8B, this step involves the generation of a new agreed key and in- and out-tables for all affected transport managers.

Once the communications channel has been successfully rebuilt (522-Y), the program 156 restores the processing state of revivable objects by issuing a series of reqRevived messages, which are then executed by the linked registrars via the restored communications channels (524).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system providing persistent capabilities for distributed systems, comprising:

a plurality of processes;

programs executing in at least a subset of said processes;

objects allocated in said subset of said processes;

communications channels between those of said plurality of processes that are in communication;

a pair of transports allocated to each pair of said processes for which inter-process communications are available, wherein a first transport of the pair of transports is located in a first process of the pair of processes and a second transport of the pair of transports is located in a second process of the pair of processes, each transport including:

an in-table with indexed in-table slots;

an out-table with indexed out-table slots; and a data structure for storing an encryption key, agreed upon with the other transport of the pair of transport;

respective ones of said out-table slots of the first transport of said pair of transports and said in-table slots of the second transport of said pair of transports being linked;

a plurality of proxies, each resident in a respective one of the processes and linked to a respective object that is resident in a different process via one of said linked slots, said proxies and pairs of transports enabling a first object in a first process to communicate transparently with a second object in a second process via a corresponding proxy in said first process linked to said second object; wherein the communications between the first and second objects are communications encrypted using the encryption key stored in the pair of transports allocated to the pair of processes comprising the first and second processes;

said programs being configured, upon detecting a problem communicating with any of said remote processes via said communications channels, to disable the proxies of said plurality proxies that are no longer able to communicate with their respective objects due to the communication problem and to delete the encryption key stored in each pair of the transports corresponding to the disabled proxies and their respective objects, and when said communications problem is remedied so that communications with said affected remote processes are restored, to revive said disabled proxies and to establish and store a new encryption key in each of the corresponding pairs of transports.

2. The system of claim 1, further comprising:

a registrar in each of said processes that maintains a record for each of said proxies in said registrar's process that is revivable, each said record uniquely designating its associated proxy and including for said associated proxy:

an expiration date; and a secret code;

said secret code for said associated revivable proxy being derived from a remote secret code associated with a remote object linked to said revivable proxy;

such that, upon a communication fault occurring between first and second processes linked by first and second transports, said processes are configured to rebuild said first and second transports, assigning new slot indices to objects and proxies which were formerly communicating across said interface and which were revivable, said processes re-establishing slot linkages between corresponding objects and proxies by matching secret codes of said linked objects and proxies.

3. The system of claim 2, wherein said communication faults comprise at least one of:

network partition;

failure of at least one of said computers; and failure of at least one of said processes.

4. The system of claim 2, further comprising:

a ref doctor in each of said processes, said ref doctor holding a reference to said registrar in same process, said ref doctor being configured to:

request that a subset of said proxies in said same process be made revivable; and request revival of a subset of said proxies in said same process;

said ref doctor inhibiting confined objects from accessing said registrar in same process.

5. The system of claim 2, further comprising:

a set of location services, each said location service including at least one process location listing, each of which includes:

an authenticatable identity of a particular process, and network location of said particular process; wherein:

each said process further includes:

a location service list listing a first subset of said location services wherein said process is registered;

each said process is further configured to register its network location and authenticatable identity with said first subset of said location services anytime said process has bee re-located; and each said transport includes:

a search path identifying a second subset of said set of location services wherein said transport's paired process is registered, and a representation of said authenticatable identity of said paired process; said transport being configured to find said paired process when said paired process has been re-located by issuing a locate request to location services designated in said search path, said locate request including said representation of said authenticatable identity of said paired process.

6. The system of claim 2, wherein said authenticatable identity comprises:

a fingerprint of a particular process; wherein:

each said process further includes:

a unique fingerprint;

each said process is further configured to register its network location and fingerprint with said first subset of said location services anytime said process has bee re-located; and each said transport includes:

a search path identifying a second subset of said set of location services wherein said transport's paired process is registered, and said fingerprint of said paired process; said transport being configured to find said paired process when said paired process has been re-located by issuing a locate request to location services designated in said search path, said locate request including said fingerprint of said paired process.

7. The system of claim 6, wherein:

said fingerprint comprises the hash of a public key associated with said process.

8. The system of claim 7, wherein:

said process is configured to transmit securely said fingerprint and network location to each of said location services via Diffie-Helman key encryption wherein a different agreed key is negotiated between each of said location services in said second subset and said process.

9. The system of claim 2, further comprising:

a makeRevivable method associated with each of said registrars; said makeRevivable method of a first registrar in a first process being invoked by a program executing in said first process with a makeRevivable message designating a first process proxy to be made revivable, said first proxy being linked to a remote object;

said makeRevivable method being configured to obtain a secret code of said remote object and return to said first registrar said secret code of said remote object, so that, following execution of said makeRevivable message, said registrar has stored in entry of said first proxy said secret code of said remote object.

10. The system of claim 9, further comprising:

a revived method associated with each of said registrars, said revived method of said first registrar being invoked by said program following said communications fault with a revived message designating said first proxy as a proxy to be revived;

said revived method in said first process being configured to use said secret code to lookup said remote object and re-establish transport links between said remote object and said first proxy.

11. The system of claim 10, wherein said second transport is configured, upon receiving a revived message and determining that said communications have not yet been restored following said communications fault, to restore said communications.

12. The system of claim 10, further comprising:

a rebuildCom method associated with each of said transports, said rebuildCom method in a second transport being invoked following said communications fault by said computer program; such that, in response to said communications fault, said second transport restores its communications with its corresponding remote transport.

13. The system of claim 2, wherein said programs are configured to rebuild said new remote references in response to a demand for a proxy whose link with a remote object was severed due to said communications fault.

14. The system of claim 2, wherein said programs are configured to rebuild said new remote references as soon as possible after said existing remote references are disabled.

15. The system of claim 2, wherein said secret code is a secret number.

16. A method of providing persistent capabilities for distributed systems, comprising the steps of:

executing programs in a plurality of processes;

allocating objects in the processes;

communications channels between those of the plurality of processes that are in communication;

establishing a pair of transports for each pair of the processes for which inter-process communications are available, wherein a first transport of the pair of transports is located in a first process of the pair of processes and a second transport of the pair of transports is located in a second process of the pair of processes, each transport including:

an in-table with indexed in-table slots;

an out-table with indexed out-table slots; and a data structure for storing an encryption key, agreed upon with the other transport of the pair of transport;

respective ones of the out-table slots of the first transport of the pair of transports and the in-table slots of the second transport of the pair of transports being linked;

establishing a plurality of proxies, each resident in a respective one of the processes and linked to a respective object that is resident in a different process via one of the linked slots, the proxies and pairs of transports enabling a first object in a first process to communicate transparently with a second object in a second process via a corresponding proxy in the first process linked to the second object; wherein the communications between the first and second objects are communications encrypted using the encryption key stored in the pair of transports allocated to the pair of processes comprising the first and second processes;

upon detecting a problem communicating with any of the remote processes via the communications channels, disabling the proxies of the plurality proxies that are no longer able to communicate with their respective objects due to the communication problem and to delete the encryption key stored in each pair of the transports corresponding to the disabled proxies and their respective objects, and when the communications problem is remedied so that communications with the affected remote processes are restored, reviving the disabled proxies and establishing and storing a new encryption key in each of the corresponding pairs of transports.

17. The method of claim 16, further including establishing a registrar in each of the processes that maintains a record for each of the proxies in the registrar's process that is revivable, each record uniquely designating its associated proxy and including for the associated proxy:

an expiration date; and a secret code;

the secret code for the associated revivable proxy being derived from a remote secret code associated with a remote object linked to the revivable proxy;

such that, upon a communication fault occurring between first and second processes linked by first and second transports, the processes are configured to rebuild the first and second transports, assigning new slot indices to objects and proxies which were formerly communicating across the first and second transports and which were revivable, the processes re-establishing slot linkages between corresponding objects and proxies by matching secret codes of the linked objects and proxies.

18. The method of claim 17, wherein the communication fault comprises at least one of:

a network partition;

a failure of at least one of the computers; and a failure of at least one of the processes.

* * * * *